US011778049B1

(12) United States Patent
Zamir et al.

(10) Patent No.: US 11,778,049 B1
(45) Date of Patent: Oct. 3, 2023

(54) MACHINE LEARNING TO DETERMINE THE RELEVANCE OF CREATIVE CONTENT TO A PROVIDED SET OF USERS AND AN INTERACTIVE USER INTERFACE FOR IMPROVING THE RELEVANCE

(71) Applicant: Pinpoint Predictive, Inc.

(72) Inventors: Evan Zamir, San Mateo, CA (US); Avi Tuschman, San Mateo, CA (US); Wei Nan Hsu, San Mateo, CA (US)

(73) Assignee: Pinpoint Predictive, Inc., San Mateo, CA (US)

( * ) Notice: Subject to any disclaimer, the term of this patent is extended or adjusted under 35 U.S.C. 154(b) by 0 days.

(21) Appl. No.: 17/861,092

(22) Filed: Jul. 8, 2022

Related U.S. Application Data

(60) Provisional application No. 63/220,943, filed on Jul. 12, 2021.

(51) Int. Cl.
  *H04L 67/306* (2022.01)
  *G06F 40/284* (2020.01)
  *H04L 67/50* (2022.01)
  *G06N 20/00* (2019.01)

(52) U.S. Cl.
  CPC .......... *H04L 67/306* (2013.01); *G06F 40/284* (2020.01); *G06N 20/00* (2019.01); *H04L 67/535* (2022.05)

(58) Field of Classification Search
  None
  See application file for complete search history.

(56) References Cited

U.S. PATENT DOCUMENTS

| 7,406,434 B1 | 7/2008 | Chang et al. |
| 9,137,372 B2 | 9/2015 | Conway et al. |
| 9,268,769 B1 | 2/2016 | Shalit et al. |

(Continued)

FOREIGN PATENT DOCUMENTS

WO   WO2011076318 A1   6/2011

OTHER PUBLICATIONS

Adali S. and J. Golbeck, "Predicting Personality with Social Behavior," 2012 IEEE/ACM International Conference on Advances in Social Networks Analysis and Mining, Istanbul, Turkey, 2012, pp. 302-309.

(Continued)

*Primary Examiner* — James A Edwards
(74) *Attorney, Agent, or Firm* — Dov Rosenfeld; Inventek

(57) ABSTRACT

One aspect of the invention is generating for a client (a marketer) a measure of relevance of online creative content for online marketing to a set of target users. Another is an interactive user interface for displaying such a measure. Another aspect of the invention is determining a signature of creative content and of components thereof. The measure of relevance is based on profiles of the targeted users and on the signature of the creative content. Another aspect of the invention providing a mechanism to improve the relevance by modifying one or more components of the creative content with respective alternate components, thus suggesting to the client modifications to the content together with a measure of how such modification changes the relevance. Another aspects is providing for an operator the user interface for viewing in real time the effect of such modifications.

27 Claims, 5 Drawing Sheets

(56) References Cited

U.S. PATENT DOCUMENTS

| | | | |
|---|---|---|---|
| 9,299,091 | B1 | 3/2016 | Sugnet et al. |
| 9,449,287 | B2 | 9/2016 | Gunjan |
| 9,741,043 | B2 | 8/2017 | Vratskides et al. |
| 10,049,103 | B2 | 8/2018 | Perez et al. |
| 10,152,681 | B2 | 12/2018 | Stephan et al. |
| 10,204,306 | B1 | 2/2019 | Sutter et al. |
| 10,218,850 | B2 | 2/2019 | Conway et al. |
| 10,262,195 | B2 | 4/2019 | Conway et al. |
| 10,269,028 | B2 | 4/2019 | Vratskides et al. |
| 10,311,085 | B2 | 6/2019 | Rezaei et al. |
| 10,489,507 | B2 | 11/2019 | Li et al. |
| 10,504,137 | B1 | 12/2019 | Angelopoulos et al. |
| 10,585,930 | B2 | 3/2020 | Allen et al. |
| 10,684,738 | B1 * | 6/2020 | Sicora ............... G06F 16/435 |
| 10,699,298 | B2 | 6/2020 | Haws et al. |
| 10,803,070 | B2 | 10/2020 | Allen et al. |
| 10,832,283 | B1 | 11/2020 | Angelopoulos et al. |
| 10,931,767 | B2 * | 2/2021 | Monge Nunez ...... H04L 51/226 |
| 10,949,434 | B1 * | 3/2021 | Tirupattur Saravanan ................. G06Q 50/01 |
| 11,574,020 | B1 * | 2/2023 | Zhai ............... G06F 16/9038 |
| 2013/0311269 | A1 | 11/2013 | Forte et al. |
| 2014/0297396 | A1 | 10/2014 | Feldman et al. |
| 2015/0309962 | A1 | 10/2015 | Lichman et al. |
| 2016/0098480 | A1 | 4/2016 | Nowson |
| 2016/0239573 | A1 | 8/2016 | Albert et al. |
| 2017/0109330 | A1 * | 4/2017 | Alon ............... G06Q 30/0201 |
| 2017/0109340 | A1 | 4/2017 | Chen et al. |
| 2017/0364857 | A1 | 12/2017 | Suri et al. |
| 2019/0370849 | A1 | 12/2019 | Abraham et al. |
| 2020/0074496 | A1 | 3/2020 | Forte et al. |
| 2021/0058355 | A1 * | 2/2021 | Dawes ............... G06F 40/205 |

OTHER PUBLICATIONS

Alam F. and G. Riccardi, Predicting Personality Traits Using Multimodal Information, in WCPR '14: Proceedings of the 2014 ACM Multi Media on Workshop on Computational Personality Recognition, Nov. 2014, pp. 15-18.

Bacnrach, Y., Kosinski, M., Graepel, T., Konli, P., & Stillwell, D. (Jun. 2012). Personality and patterns of Facebook usage. In Proceedings of the 4th annual ACM web science conference (pp. 24-32).

Bert-base-uncased, in <huggingface.co/bert-base-uncased> available Apr. 30, 2021.

Brown et al., Language Models are Few-Shot Learners, preprint submitted for publication, published on arxiv on Jul. 22, 2020, retrieved Apr. 30, 2021 at https://arxiv.org/pdf/2005.14165.pdf.

Devlin J, MW Chang, K Lee, K Toutanova, Bert: Pre-training of deep bidirectional transformers for language understanding, arXiv preprint arXiv, May 2019, retrieved Apr. 30, 2121 at https://arxiv.org/pdf/1810.04805.pdf.

Ferwerda, Bruce et al. "Predicting Personality Traits with Instagram Pictures," Proceedings of the 3rd Workshop on Emotions and Personality in Personalized Systems 2015 (2015): n. pag.

Golbeck J., C. Robles, K. Turner: "Predicting personality with social media," CHI EA '11: CHI '11 Extended Abstracts on Human Factors in Computing Systems, May 2011 pp. 253-262.

Golbeck J., C. Robles, M. Edmondson*, and K. Turner: "Predicting Personality from Twitter," 2011 IEEE International Conference on Privacy, Security, Risk, and Trust, and IEEE International Conference on Social Computing, pp. 149-156.

Hu S., "Video2Vec: Learning Semantic Spatio-Temporal Embedding for Video Representations," M.S. Thesis, Department of Computer Engineering, Arizona State University, Tempe, Arizona, Dec. 2016, retrieved Jun. 15, 2021 at https://core.ac.uk/download/pdf/79587157.pdf.

Hu S., Yikang Li and Baoxin Li, "Video2vec: Learning semantic spatio-temporal embecidings for video representation," 2016 23rd International Conference on Pattern Recognition (ICPR), 2016, pp. 811-816, doi: 10.1109/ICPR.2016.7899735.

Huigol, Purva, Top 6 Open Source Pretrained Models for Text Classification you should use, retrieved May 21, 2021 at https://www.analyticsvidhya.com/blog/2020/03/6-pretrained-models-text-classification/.

Kalghatgi, MP, M. Ramannavar, N.S. Sidnal, A Neural Network Approach to Personality Prediction based on the Big-Five Model, International Journal of Innovative Research in Advanced Engineering (IJIRAE), Issue 8, vol. 2 (Aug. 2015), pp. 56-63.

Kim Y., "Convolutional neural networks for sentence classification," in Proceedings of EMNLP 2014, available May 15, 2021 at https://www.aclweb.org/anthology/D14-1181.pdf.

Krizhevsky, A, I. Ilya Sutskever, and G.E. Hinton, ImageNet Classification with Deep Convolutional Neural Networks, Retrieved Jul. 12, 2022 at https://papers.nips.cc/paper/2012/file/c399862d3b9d6b76c8436e924a68c45b-Paper.pdf.

Marui, Junki, Category-enhanced Embedding Model for Massive Text Data, Doctor Thesis, School of Engineering Technology Management for Innovation, The University of Tokyo, Feb. 2016, retrieved May 23, 2021 at.

Mikolov, Tomas, Kai Chen, Greg Corrado, and Jeffrey Dean. "Efficient estimation of word representations in vector space." arXiv preprint arXiv:1301.3781 (2013), retrieveed May 15, 2021 at https://arxiv.org/pdf/1301.3781.pdf.

Nguyen, Dat Quoc ,Vu, Thanh and Tuan Nguyen, Anh : "BERTweet: a pre-trained language model for English Tweets", Proceedings of the 2020 Conference on Empirical Methods in Natural Language Processing: System Demonstrations, Oct. 2020, Association for Computational Linguistics, Retrieved Apr. 14, 2021 at https://arxiv.org/pdf/2005.10200.pdf.

Nie D., Z. Guan, B. Hao, S. Bai and T. Zhu, "Predicting Personality on Social Media with Semi-supervised Learning," 2014 IEEE/WIC/ACM International Joint Conferences on Web Intelligence (WI) and Intelligent Agent Technologies (IAT), Warsaw, Poland, 2014, pp. 158-165, doi: 10.1109/WI-IAT.2014.93.

Singh Ankur, End-to-end Masked Language Modeling with BERT, published online on Keras.io on Sep. 18, 2020, retrieved on Apr. 30, 2020 at https://keras.io/examples/nlp/masked_language_modeling/.

Skloot Greg: What Is Personality Ai?, retrieved Mar. 19, 2021 at https://www.crystalkows.com/blog/what-is-personality-ai.

Szegedy Christian, Wei Liu, Yangqing Jia, Pierre Sermanet, Scott Reed, Dragomir Anguelov, Dumitru Erhan, Vincent Vanhoucke, Andrew Rabinovich; Going Deeper with Convolutions, Proceedings of the IEEE Conference on Computer Vision and Pattern Recognition (CVPR), 2015, pp. 1-9, §. Preprint retrieved May 11, 2021 at https://arxiv.org/pdf/1409.1556.pdf.

Tadesse M. M., H. Lin, B. Xu and L. Yang, "Personality Predictions Based on User Behavior on the Facebook Social Media Platform," in IEEE Access, vol. 6, pp. 61959-61969, 2018, doi: 10.1109/ACCESS.2018.2876502.

Wen Ying, Jun Wang ,Tianyao Chen, Weinan Zhang: CAT2VEC: Learning Distributed Representation of Multi-Field Categorical Data, Submitted 2016 for ICLR 2017, REtrieved Apr. 28, 2021 at https://openreview.net/pdf?id=HyNxRZ9xg.

Zhang, W., Du, T., & Wang, J. (2016). Deep Learning over Multi-field Categorical Data—A Case Study on User Response Prediction. ECIR. Retrieved Apr. 28, 2021 at https://arxiv.org/pdf/1601.02376.pdf.

Zhuang, C. et al. : Unsupervised Learning from Video with Deep Neural Embeddings. Mar. 10, 2020, retrieved Jul. 12, 2022 at https://arxiv.org/pdf/1905.11954.pdf.

\* cited by examiner

MACHINE LEARNING TO DETERMINE THE RELEVANCE OF CREATIVE CONTENT TO A PROVIDED SET OF USERS AND AN INTERACTIVE USER INTERFACE FOR IMPROVING THE RELEVANCE

FIELD OF THE INVENTION

The present disclosure relates to artificial intelligence and modeling, and in particular to machine learning methods of and a machine that includes a machine learning engine for determining a multidimensional signature of a provided set of users and the signature of an item of creative content. The present invention also related to predicting and improving the relevance of creative content to a provided set of users using a signature of the provided creative content and on a signature of the provided population. The invention also relates to an interactive user interface for displaying and improving the relevance of the provided item of creative content to the provided set of users.

BACKGROUND

It is common for marketers and advertisers to send creative content to audience segments, including users of online platforms that will hopefully respond in a desired manner, e.g., by purchasing a product.

It is known to automatically collect past online data on online users, and then to use the automatically machine-collected past online data as inputs for machine-implemented methods to target a set of users by sending such users creative content.

It is also known to improve online creative content by identifying components of the creative content, varying at least one component to create a variant of the creative content, sending the variants each to a respective sample of users, measuring users' responses for each variant; and selecting a variant according to a measure determined from the measured responses. Repeating this process can improve the creative content.

It is not known how to determine a multidimensional signature of creative content based on online items of creative content posted by a set of users. It is not known how to improve calculate and improve a measure of the relevance of creative content to a provided set of users based on a multidimensional signature of the provided creative content and on a multidimensional signature of the provided population, with the relevance measurement not requiring sending and measuring the response of users in the provided set of users to the creative content or to modifications thereof. It is also not known how to provide a client with a user interface for obtaining the measure of relevance of a client-provided message of creative content to a client-provided audience of users or to an audience of similar users, and to provide on the user interface feedback on how the measure of relevance would change as the client makes modification to the message.

BRIEF DESCRIPTION OF THE DRAWINGS

Various embodiments in accordance with the present disclosure will be described with reference to the drawings, in which.

DETAILED DESCRIPTION OF EXAMPLE EMBODIMENTS

Overview

Figure 1:
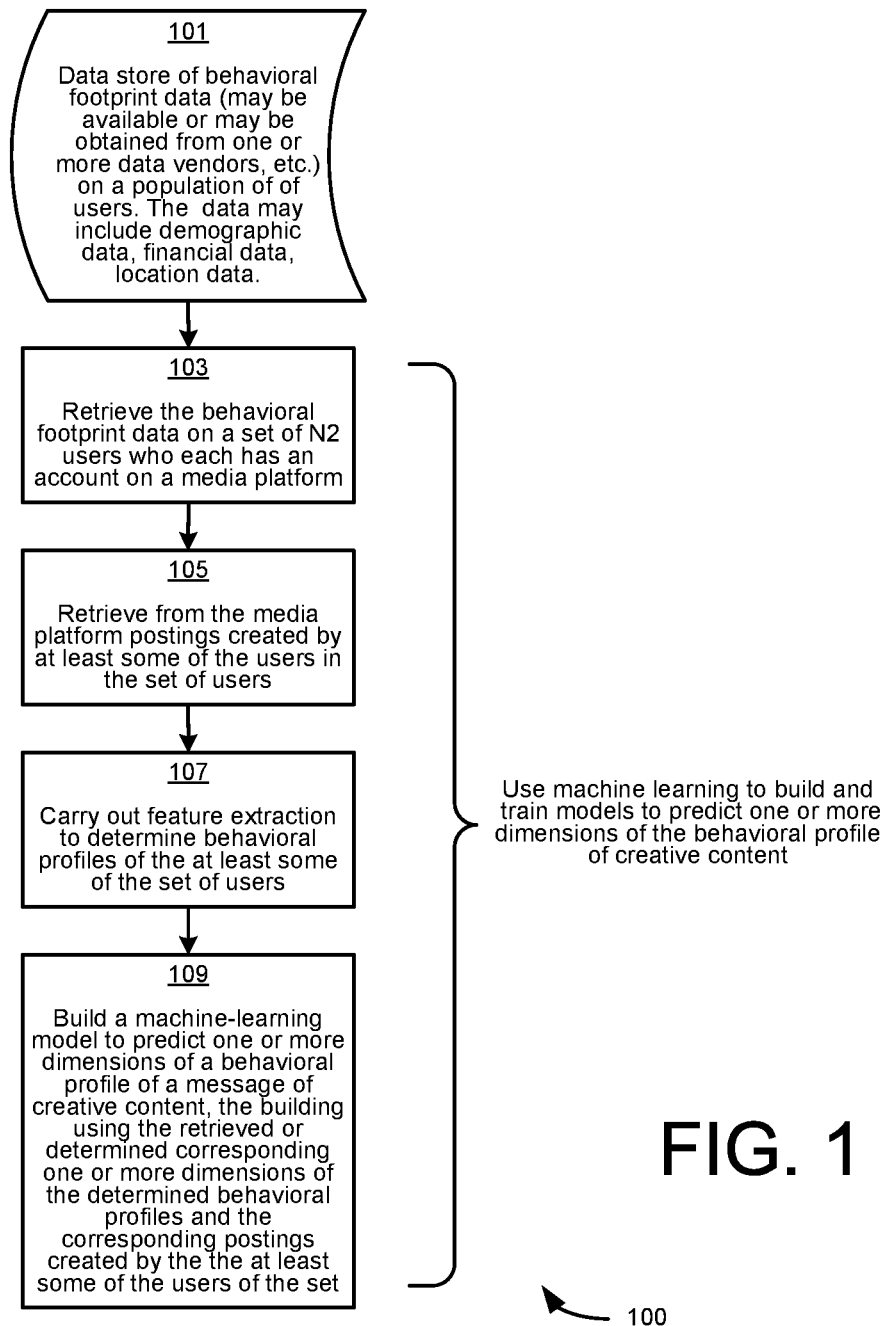
FIG. 1 is a flowchart of an embodiment of using machine learning to build and train a model for predicting one or more dimensions of the signature of creative content.

One aspect of the invention is using machine learning implemented on a system to determine a multidimensional signature of creative content and of components thereof. Another aspect of the invention is generating for a client, e.g., a marketer, a measure of relevance of an item of creative content to a set of targeted users. The measure of relevance is based on multidimensional profiles of the set of targeted users (including but not limited to the users of online platforms) and on the multidimensional signature of the item of creative content. The profiles of the targeted users are determined by feature extraction from behavioral data on the target users. Another aspect of the invention is partitioning the creative content into components, and providing a mechanism to improve the measure of relevance by modifying one or more components of the creative content with respective alternate components, thus suggesting to the client modifications to the content together with a measure of how such modification changes the measure of relevance. Another aspect is providing a user interface for the client to obtain feedback in real time of how such modifications change the measure of relevance.

As used herein an artificial intelligence system (also called a system for artificial intelligence) is a system designed to carry out efficiently artificial intelligence tasks, and includes one or more processors, storage and may include a machine learning engine, which is a special-purpose hardware designed for machine-learning and other artificial intelligence tasks.

Particular embodiments include a system for artificial intelligence. The system includes at least one processor and storage, and in some embodiments, a machine learning engine. The storage contains code that when executed by the system causes the system to:

retrieve behavioral footprint data of a set of N2 users who each has an account on a media platform, the retrieving being from a data store of behavioral footprint data of a population of users;

retrieve postings from the media platform, the postings created by at least some of the users of the set of N2 users;

carry out feature extraction to determine one or more dimensions of the profiles of at least some of the users of the set of users;

build a machine-learning model to predict the one or more dimensions of a profile of a message of creative content, the building using the determined one or more dimensions and the corresponding postings of the at least some of the users of the set;
receive a message of creative content from a client;
use the built machine-learning model to determine the one or more dimensions of a signature of the received message;
receive from the client a set of client-selected users and select therefrom a subset of client-selected users on whom behavioral footprint data is in the data store;
determine the one or more dimensions of the profiles of the subset of client-selected users;
determine the one or more dimensions of a signature of the subset of the client-selected users; and
compare the one or more dimensions of the signatures of the subset of the client-selected users and of the of the received message to determine a score indicative of the relevance of the message of creative content to the subset of client-selected users.

Particular embodiments include a method implemented in a system for artificial intelligence, the method comprising:
retrieving behavioral footprint data of a set of N2 users who each has an account on a media platform, the retrieving being from a data store of behavioral footprint data of a population of users;
retrieving postings from the media platform, the postings created by at least some of the users of the set of N2 users;
carrying out feature extraction to determine one or more dimensions of the profiles of the at least some of the users of the set of users;
building a machine-learning model to predict the one or more dimensions of a profile of a message of creative content, the building using the determined one or more dimensions and the corresponding postings of the at least some of the users of the set;
receiving a message of creative content from a client;
using the built machine-learning model to determine the one or more dimensions of a signature of the received message;
receiving from the client a set of client-selected users;
selecting from the set of client-selected users a subset of client-selected users on whom behavioral footprint data is in the data store;
determining the one or more dimensions of the profiles of the subset of client-selected users;
determining the one or more dimensions of a signature of the subset of the client-selected users; and
comparing the one or more dimensions of the signatures of the subset of the client-selected users and of the of the received message to determine a score indicative of the relevance of the message of creative content to the subset of client-selected users.

Particular embodiments include a non-transitory machine-readable medium comprising instructions that when executed by a system for artificial intelligence, cause the method described above to be carried out.

In some versions, the retrieving the behavioral footprint data on the set of N2 users includes retrieving a sample of N1 users from a data store, each of the N1 users having a behavioral-footprint-user-ID, and obtaining from the behavioral-footprint-user-IDs of the N1 users the media-platform-user-IDs of the set of N2 users who each has an account on a media platform,
Each posting comprises a sequence of one or more tokens, a token being a word, an emoji, or an image.

Some versions of the artificial-intelligence system of the above embodiments include a machine-learning engine, and in such versions, using the machine learning to build the model and/or using the model uses the machine-learning engine.

In some versions, the measure of relevance is a measure of similarity of the one or more dimensions of the signature of the message of creative content and the corresponding one or more dimensions of the signature of the subset of client-selected users.

Some versions of the method, e.g., the method carried out by executed the code in the system for artificial intelligence embodiment, further include receiving a modification of the message of creative content to form a modified message of creative content; and determining the measure of the relevance of the modified message to the subset of client-selected users.

In some such versions, the modification of the message comprises replacing a chosen token of the message of creative content with a replacement token.

In some versions, the obtaining of media-platform-user-IDs includes carrying out a contact-matching method on the user IDs of at least some of the N1 users. In some such versions, the carrying out the contact-matching method includes submitting the user IDs of at least some of the N1 users to contact-mapping service.

In some such versions, the carrying out of the contact matching method includes using an identity-resolution graph to match contact information.

Some versions of the method, e.g., the method carried out by executed the code in the system for artificial intelligence embodiment, may further include filtering the N2 retrieved postings to form a filtered corpus of postings by N3 of the N2 users, N3≤N2, such that the behavioral footprints of the N3 users are retrieved and the one or more dimensions of the profiles of the N3 users are determined, and such that the retrieved postings of the N3 users and the one or more dimensions of the N3 users are used to determine the model. The filtering in some implementations may be filters according to one or more posting-viability criteria, for example, one or both limiting the number of postings by any single user to an upper limit and excluding postings by any user who has fewer than a minimum of number postings. In some versions, N3=N2.

In some versions, at least some of the users whose postings are retrieved have a plurality of postings, and determining the model includes determining a user vector embedding of each of the users whose postings are retrieved. In some such versions, each user's vector embedding is determined from the vector embeddings of the postings of said each user. As an example, each posting's vector embedding is determined from the vector embeddings of the tokens of said each posting, for example, using word2vec. In other versions, each posting's vector embedding is determined using a deep neural network designed to determine a posting's vector embedding directly from the posting. As an example of such other versions, for the case the postings are each a short text posting or a text and emoji postings posted in a social-media network, the deep neural network includes BERTweet.

In some versions, the determining of the one or more dimensions of the signature of the subset of client-selected users includes determining the one or more dimensions of a representative profile of the subset of client-selected users, and normalizing the one or more dimensions of the representative profile.

In some versions, the tokens are words. In some versions, the postings are Tweets.

Particular embodiments include a processing system comprising one or more processors, a machine learning engine, a display screen, and storage, the storage comprising instructions that when executed cause a user interface to appear on the display screen and further cause:

displaying on the user interface on the display screen links to one or more client selected sets of users, each user of each set having stored in a server coupled to the processing system a respective multi-dimensional profile of said each user, each of the displayed client-selected sets further having stored in the server a signature of said each set having multiple dimension, the signature determined from the profiles of the users of said each displayed client-selected sets;

accepting from an operator via the user interface a selection of one of the displayed sets of users;

accepting from an operator via the user interface a message made up of a set of tokens from a dictionary of tokens whose signatures are stored in the server or readily determined;

determining the signature of the accepted message from the signatures of at least some of the tokens in the message; and displaying on the user interface a graphic indication of a measure of relevance of the accepted message to the selected displayed set of users, the measure of relevance determined from the signature of the selected displayed set of users and the signature of the accepted message.

In some versions the instructions when executed further cause:

responsive to accepting from the operator the selection of one of the displayed sets of users, displaying a sorted set of tokens sorted according to the measure of relevance of each token in the set to the selected displayed set of users, the sorted tokens obtained from the dictionary of tokens and token signatures.

Particular embodiments include a method implemented on a processing system that includes one or more processors, storage, and a machine learning engine. The method includes:

displaying a user interface on a display screen, and displaying on the user interface links to one or more client selected sets of users, each user of each set having stored in a server coupled to the processing system a respective multi-dimensional profile of said each user, each of the displayed client-selected sets further having stored in the server a signature of said each set having multiple dimension, the signature determined from the profiles of the users of said each displayed client-selected sets;

accepting from an operator via the user interface a selection of one of the displayed sets of users;

accepting from an operator via the user interface a message made up of a set of tokens from a dictionary of tokens whose signatures are stored in the server or readily determined;

determining the signature of the accepted message from the signatures of at least some of the tokens in the message; and displaying on the user interface a graphic indication of a measure of relevance of the accepted message to the selected displayed set of users, the measure of relevance determined from the signature of the selected displayed set of users and the signature of the accepted message.

In some versions the method includes, responsive to accepting from the operator the selection of one of the displayed sets of users, displaying a sorted set of tokens sorted according to the measure of relevance of each token in the set to the selected displayed set of users, the sorted tokens obtained from the dictionary of tokens and token signatures.

In some versions, the displayed tokens of the message are active such that any token may be selected by the operator. In such versions, selecting one of the tokens provides for the operator to enter an alternate token to produce a modified message. Responsive to entering the alternate token, the graphic indication of the measure of relevance changes to indicate the measure of relevance of the modified message to the selected displayed set of users.

In some such versions, the method includes (or in the processing system, the instructions when executed cause) responsive to selecting one of the tokens, determining a set of tokens that are contextually similar to the selected token, and displaying at least some of the determined set of contextually similar tokens on the user interface. The displayed tokens are active such that the operator may select one of the contextually similar tokens to be entered as the alternate token.

In some such versions, the at least some of the contextually similar tokens are displayed in order of the amount of change selecting in the measure of relevance that would be caused by selecting the displayed contextually similar token.

In some versions in which the displayed tokens of the message are active, selecting a displayed token of the message causes a masked language model to modify a token in the message to form a modified message and responsive to forming the modified message, the graphic indication of the measure of relevance changes to indicate the measure of relevance of the modified message to the selected displayed set of users.

In some versions, the method includes (or the instructions executing causes) responsive to accepting from the operator the selection of one of the displayed sets of users, displaying in a graph area of the user interface a radar view of a number of the dimensions (traits) of the signature of the set of users, the radar view having the number of traits as radial axes. The axes are the number of traits that diverge the most from the same traits in a signature of a population of interest.

In some versions, the method includes (or the instructions executing causes) responsive to accepting the message, also displaying in the graph area of the user interface a radar view of the number of the traits of the signature of the message. In such a version, the axes may be the number of traits of the signature of the message that diverge the most from the same traits in the signature of the message.

In some versions, responsive to entering the alternate token, the radar view of the number of the traits of the signature changes to indicate the traits of the signature of the modified message.

In the above method and processing system, in some embodiments, the displaying on the user interface of the results of any action taken by the operator e.g., selecting a users, making changes to the message, and so forth, preferably occur in real time to provide feedback to the operator in real time.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

SOME EXAMPLE EMBODIMENTS IN MORE DETAIL

Definitions

An item of creative content refers to an item of content that a user or client (a marketer or advertiser) may create. Such items of creative content by users may be discovered, in the case of online items by scraping the Web, or by licensing such data. Such items also may be available to a service provider who also owns a social media platform or an email service or a CRM. An item of creative content may include natural language text (a set of natural language words and emoji), and/or images and/or video presentations. An important aspect of the invention is presenting an item of creative content to a set of client-selected users directly, or to an audience generated by a third-party online platform based said audience's similarity to a set of client-selected users.

Media is the means through which items of creative content is presented.

A Client is a person or organization that desires to present creative content, e.g., to a set of online users or offline audience segments (the client-selected users). A client, for example, may be a marketer.

A profile (also called a behavioral profile) of a person includes a set of one or more demographic dimensions, and one or more purely behavioral dimensions. In one embodiment, each profile has 31 dimensions. Other embodiments have a different number of dimensions.

Behavioral data (also called behavioral footprint data) on a user (also called the behavioral footprint of the user) may include:
  Demographic data;
  and may include one or more purely behavioral dimensions such as (without limitation) one or more of:
  Offline and online transactions by the user;
  Internet of Things (IOT) data by the user;
  Credit and other financial information on the user;
  Web browsing behavior of the user;
  Social media data viewed, engaged with, or created by the user;
  Creative content (text, images) created or engaged with by the user;
  Geolocation data;
  Virtual and augmented reality data on the user; and
  Purchasing history.

Some or all of the behavioral data may be licensed or purchased from one or more data providers, e.g., data brokers. Furthermore, some of the behavioral data may be obtained in categorized form.

A token may be a word, an emoji, an image, or a video.

A vector embedding is a numerical vector representation of a token (e.g., word, emoji, image, video) or a sequence of tokens (e.g., a sentence, a video segment) or of a behavioral footprint. In some embodiments, creating these vector embeddings is a step for training machine-learning models to predict at least some profile dimensions, in particular neural-network models that are used in some embodiments of the invention for such prediction.

The relevance of an item of creative content to a set of client-selected users may be an indication of the probability of the client-selected users engaging with the item of creative content, e.g., by an online click, or by buying the related product or service of the content.

The measure of relevance of a message to a set of users is a measure of the closeness of the vector signature of the set users and the vector signature of the message. The measure of difference may be the square of the distance between the two vectors, or the cosine similarity or some other measure of vector closeness.

Media platform is a platform where one may post an item of creative content (called a posting) in the form of a sequence of tokens. A social network is an example of a media platform.

A posting is an item of creative content posted in a medial platform.

In real time when referring to displaying changes on an interactive user interface on a screen as a result f an action by an operator means that the changes or results are displayed within seconds of the operator carrying out the action so the feedback is immediately provided to the operator.

URLs

Throughout the description, URLs are represented with "~dot~" denoting the dot (".") character in the URL, so that any online display of such a representation of a URL would not inadvertently become an active link.

Acquisition of Behavioral Data on Users and Conversion into Behavioral Feature Vectors One embodiment assumes availability to a service operator of behavioral footprint data on a large enough number, denoted N0, of individuals to represent the population of users. N0 for example may be in the order of 250 million. Behavioral data on a population may be collected by the operator of an embodiment of the invention (the service operator), and also is readily obtained from one or more behavioral data providers, typically from a plurality of behavioral data providers. There are many such behavioral data providers in existence, e.g., as vendors of behavioral data. As an example, the webpage narrative~dot~io/data-partners (retrieved 2021 Apr. 27) included the following non-exhaustive list of behavioral data vendors, and of course there are many more not listed on that web page: 33Across; AnalyticsIQ; ASL Marketing; Bridge; Complementics; Connected Interactive; Cross Pixel; Delux; Disqus; Epsilon, Fanatics; FullContact; ICumumlus; ID5; Infutor; Invesibly; Killi; Kochava; LiveIntent; Media Source Solutions; Mobilewalla; OnAudience; Onemata; Publishers Clearing House; SafeGraph; Safe-Reach; ShareThis; Skupos; Solipay; Specialists Marketing Services; StartApp; Survata; Tamoco; Throtle; TransUnion; TrueData; Unacast; Venpath; and Webbulla. The website datarade~dot~ai retrieved 2021 Apr. 27 had links to over 2000 data providers worldwide.

For each user in a population, there may be a different number of dimensions of a behavioral footprint available, some of which may be aggregated values, while others may be categories. For some user, there may be 500 data points, for another there may be 5000 data points. In one embodiment, the behavioral data is stored in a user data store with each user having a behavioral-footprint-user-ID. There are many ways possible for onboarding the behavioral data from the behavioral data provider(s), and may involve mapping the different ways each of the providers identifies users to the behavioral-footprint-user-ID, and consolidating the behavioral data obtained from different data providers for a particular user so that each user has a behavioral footprint from all the providers. As an example, the behavioral-footprint-user-ID may be one of the ways that one of the data providers identifies users, in which case the onboarding process would include mapping the different user ID systems to the behavioral-footprint-user-ID system. Such mapping may use a third-party user-ID mapping service. In one embodiment, the behavioral-footprint-user-ID contains no personally identifying information (PII) such as an email address, actual name, address, and so forth. One example of a behavioral-footprint-user-ID is a hashed email address.

In one embodiment, the behavioral data may be (but is not necessarily) stored in a database with one row per user.

Embodiments of the invention use machine learning (ML) techniques to carry out feature extraction to generate for each user's behavioral footprint, a vector of M real-valued dimensions for the user. In one embodiment, a machine learning engine (ML engine) is used in implementing the ML techniques. In one embodiment, M=100, while for another embodiment, M=500. We call such an M-vector for a user as the behavioral profile of the user. This also may be called the behavioral M-vector, or simply the behavioral vector of the user. One embodiment uses word2vec for feature extraction (see Mikolov, Tomas, Kai Chen, Greg Corrado, and Jeffrey Dean. "Efficient estimation of word representations in vector space." arXiv preprint arXiv: 1301.3781 (2013)). Another embodiment uses category2vec. (Marui, J. and Hagiwara, M.: Category2Vec 単語・段落・カテゴリに対するベクトル分散表現 言語処理学会第21回年次大会 発表論文集 translated as "Vector Distributed Representation for Single Words/Paragraphs/Categories," Proceedings of the 21st Annual Meeting of the Natural Language Processing Society, pp. 680-683 (2015)). For an English language reference on category2vec, see Junki Marui, Category-enhanced Vector embedding Model for Massive Text Data, Doctor Thesis, School of Engineering Technology Management for Innovation, The University of Tokyo, February 2016, retrieved 2021 May 23 at repository~dot~dl~dot~itc~dot~utokyo~dot~ac~dot~jp/?action=repository_uri&item_id=48045&file_id=14&file_no=1. Marui et al. have published code for category2vec available (2021 Mar. 23) at github~dot-~com/rakuten-nlp/category2vec.

For example, in one embodiment of the present invention, the behavioral footprints of the N0 users obtained from the one or more data vendors, and possibly also by the operator of the service described herein is in, or is converted to categorized form. There may be many categories, and for each user, each category may have a value that is Boolean, discrete, or numerical. Numerical values may be converted to discrete values by dividing the range into a discrete number of intervals. These may be tokenized, e.g., using a window of a number of tokens, e.g., 100 tokens (a token being, for example, a word). A version of word2vec may then be used for feature extraction to convert each behavioral footprint into a compact real valued vector of, e.g., 100 dimensions.

In some embodiments, the behavioral data on users may be converted into vectors (behavioral profiles) using other ML methods, such as latent Dirichlet allocation (LDA), alternating least squares (ALS). Singular value decomposition, or others.

Selection of Some Users that Each have a Media Platform Account and Determining the Profile of an Item of Creative Content.

FIG. 1 is a flowchart of an embodiment 100 of using machine learning to determine behavioral profiles of users, and determining one or more dimensions of the behavioral signature of creative content.

Figure 2:
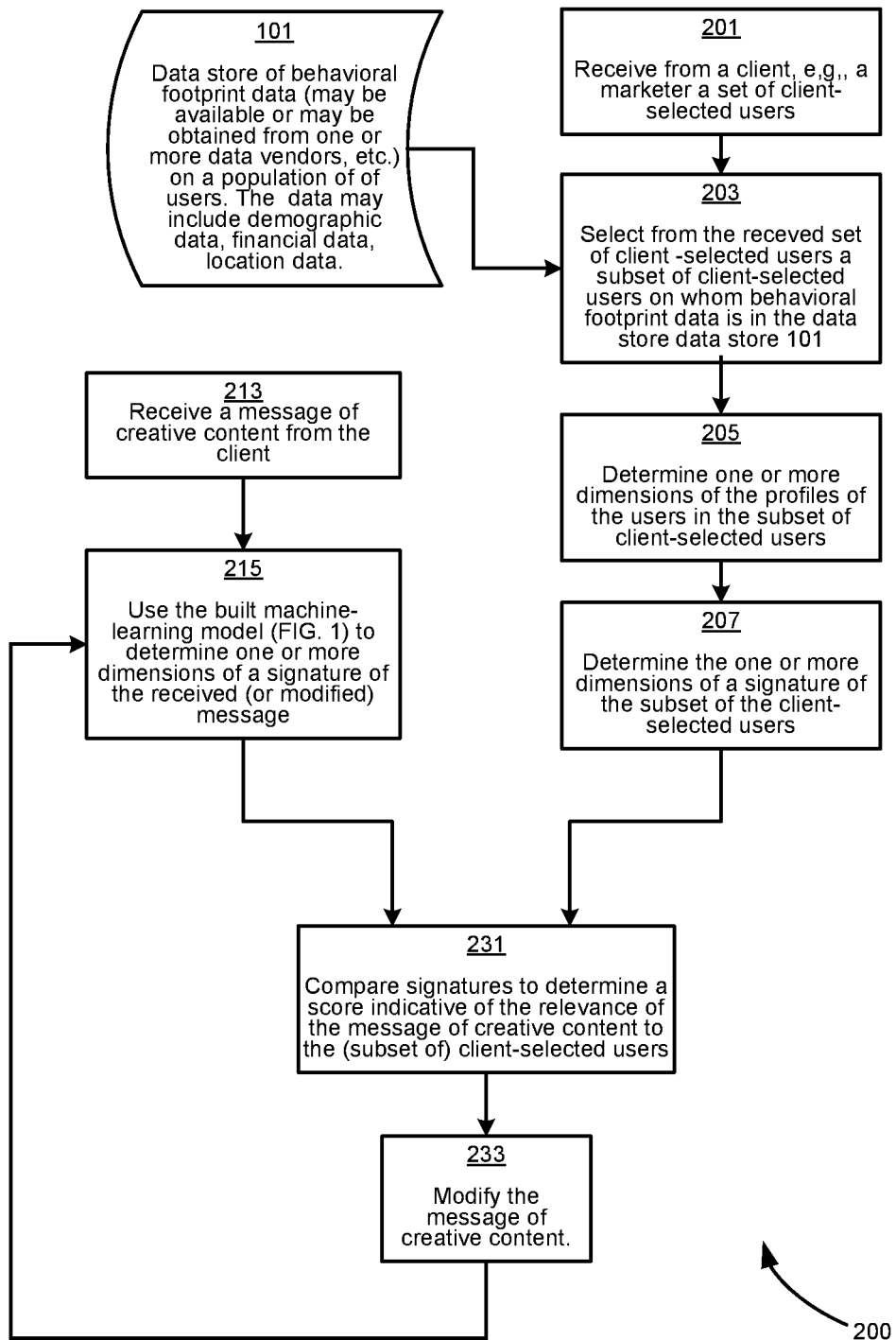
FIG. 2 is a flowchart of an embodiment of determining a measure of the relevance of client-provided creative content to client-selected users.

FIG. 2 is a flowchart of an embodiment 200 of determining a measure of the relevance of marketer-provided creative content to client-selected users.

Figure 3:
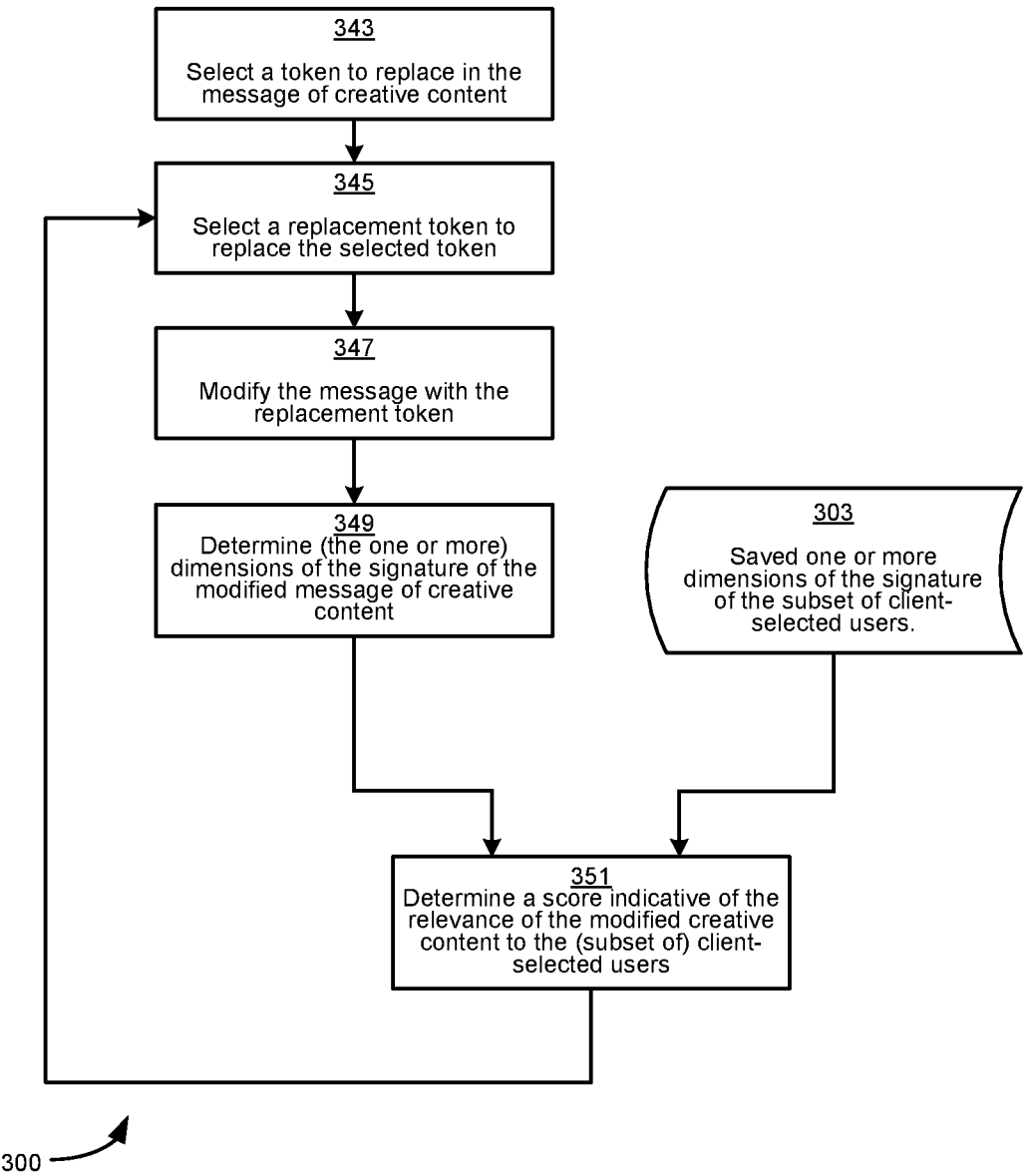
FIG. 3 is a flowchart of an embodiment of replacing a token of an item of client-provided creative content to attempt to improve the measure of relevance of creative content after replacement.

FIG. 3 is a flowchart of an embodiment 300 of replacing a token of client-provided creative content to attempt to improve the measure of relevance of creative content after replacement.

Considering FIG. 1, step 103 includes selecting from the N0 users in a data store 101 of behavioral footprint data a set of N2 users who have behavioral-footprint-IDs and who also have accounts on a media platform that provide for a user ability to post and repost items of media content, called postings, e.g., text and images. These postings are available on the media platform, such as on Twitter, etc. Step 105 includes retrieving postings created by at least some of set of N2 users.

For this, one embodiment retrieves a random sample of N1 of the N0 users and carries out a contact matching method on the behavioral-footprint-IDs to match the behavioral-footprint-IDs to corresponding IDs (or other handles) used in the media platform of interest, e.g., in Twitter. We call such user IDs media-platform-user-IDs. Carrying out the contact-matching method may include submitting the user IDs of at least some of the N1 users to an identity-resolution mapping service such as FullContact, LiveRamp, People Data Labs, Pipl, Stirista, or similar that can map behavioral-footprint-user-IDs to media-platform-user-IDs. The identity-resolution service, whether carried out internally using our own identity data or externally by a third party, may include using a cross-reference data structure such as an identity-resolution graph or other data structure to match contact information.

One version includes first determining the approximate match rate for random user IDs having the media platform account using the contact service. In one embodiment, it was 8%. This determines how many user IDs to randomly select to carry out contact matching. In one embodiment, a number N1 of between 10M and 20M randomly selected IDs are sent to obtain the N2 media platform accounts, N2 in the order of 1 M.

The set of retrieved postings forms a corpus of postings. In one embodiment, each posting is a set of tokens. A token may be a word, an emoji, an image, or a video scene. In one embodiment a token is a word, in another a token is a word or emoji, and in yet another, a word or emoji or image, and in yet another, a video with or without other forms of token, so that in one embodiment, the postings may be an ordered set of English words, in another embodiment, words and emoji, wherein an individual emoji can be considered as one of the letters of the alphabet, or can be considered an image. In yet another version, the postings may be one or more images, and in yet another, words and images. In yet another, a posting may be a video presentation. In the case of an image, as an example, the literal URL of the image location may be considered as the unique token of the image.

Note that in some embodiments, for computational cost reasons, the corpus may be a down-sampled version. We call this filtering the postings according to one or more filtering criteria. In one version, the down-sampling may include limiting the number of posts from any one user. In one embodiment for Twitter postings, no more than 300 Tweets are used for each user, even though some users may have posted many more Tweets. In experiments, some tiny improvement was noticed when sampling up to 300 tweets per user as opposed to 100, while beyond the 300 per user limit, diminishing returns were assumed. In some versions, additionally, any user who has less than a threshold number of posts, e.g., less than 30 posts is not included. The corpus thus may be a filtered corpus that includes filtered postings from N3 of the N2 users. In description and claims, when we mention the N3 users and the associated corpus, it may be that there is no leaving out users, so that N3 may be the same as N2. Furthermore, there may be no limiting of the number of postings per user.

Recall for each of the N2 or N3 users, an embodiment has or can readily determine dimensions of the profiles of the users. Step 107 includes retrieving or determining using feature extraction one or more dimensions of the profile of each user of the N3 that has postings in the corpus or subset of the corpus, the determining being from the behavioral footprint of each such user. Step 109 includes using machine-learning methods to build and train a model to predict one or more dimensions of a behavioral profile of a message of creative content. Training the model uses for training the corpus or a subset of the corpus by the N3 users, and the one or more dimensions of the profile of each user of the at least subset of N3 users.

Mapping User-Generated Media Content to Numerical Vector Features

There are media postings from N3 users in the post-filtering corpus (filtering may have removed users and their posts who have less than a minimum number, and/or may have kept only a pre-set maximum postings from any user). Each user of the N3 users has a behavioral footprint available, and thus has available for an analytics system any one or more dimensions of interest of the user's profile.

A "vector embedding" of a token or sequence of tokens is the numerical vector representation of the token (e.g., word) or the sequence of tokens (e.g., sentence). In some embodiments, creating these vector embeddings is a step in carrying out step 109, in particular of training machine-learning models to predict profile dimensions, in particular neural-network models that are used in some embodiments of the invention for such prediction.

In a first embodiment, the analytics system is configured to:

(a) Generate a vector embedding as a vector representation of each token, e.g., each word in the (filtered) corpus. Each vector embedding is a feature vector of a number of real numbers. While in alternate versions, one-hot encoding of a token is used to generate feature vectors, a first embodiment includes using word2vec to determine a real-valued vector of, for example, 100 dimensions for each token in the corpus of postings from N3 users or a subset of that corpus. In the word2vec model. The vector embedding is optimized over all the text in the (filtered) corpus of postings, such that missing words can be predicted with good accuracy. Once the word2vec model is trained, the token vector embeddings (each a real-valued 100-vector) are fixed.

(b) For each user's postings, create a representative vector embedding for that posting. In one embodiment, the representative vector is generated by averaging the vectors of the tokens in the posting, while in another version, the representative vector is generated by having each element be the median of the vectors' corresponding element. In yet another embodiment, a weighted average is the representative vector. Note that representative vector of each posting is created after filtering the posting so that it contains unique words and no articles, prepositions, or conjunctions.

As an alternate to steps (a) and (b), as an alternative to training a word2vec model using the postings in the corpus, one embodiment uses a pre-trained deep-learning model applicable to the type of media content. Training deep learning models for text is known. See for example, Jacob Devlin, Ming-Wei Chang, Kenton Lee, Kristina Toutanova, "BERT: Pre-training of Deep Bidirectional Transformers for Language Understanding, arXiv {1810.04805v2}, May 2019, available 2021 May 19 at arxiv~dot~org/pdf/ 1810~dot~04805v2~dot~pdf. For some media types, pre-trained deep-learning models are available. Twitter is a platform for posting short posts of tokens (words, emoji) called Tweets. BERTweet (Nguyen et al., "BERTweet: A pre-trained language model for English Tweets," retrieved 2021 May 11 at arxiv~dot~org/pdf/ 2005~dot~10200~dot~pdf, 2020) is a deep-learning model based on BERT that was trained on 850M Tweets. Huggingface, Inc. of New York, New York is a company that specializes in building and serving deep-learning models for natural language processing. Some embodiments of the invention applicable to Tweets and similar posts of a sequence of tokens use a version of BERTweet pre-trained by Huggingface, with each sequence of tokens producing a 768-dimensional vector.

Thus, in a variation of sub-steps (a) and (b), for postings being Tweets, the system is configured to use a pre-trained BERTweet model to generate representative vector embeddings for posts of users that are Tweets.

(c) Determine a representative vector of each individual's posts to produce a single "user vector embedding" for each of the N3 users, such vector embedding being either a 100-dimensional vector (with word2vec) or a 768-dimensional vector (with BERTweet). In one embodiment, this is carried out by averaging the vectors of the postings of the user, while in another version, the media vector of the postings' vectors is representative, and in yet another embodiment, a weighted average is the representative vector, with each weight dependent on such factors are when the posting was made.

Thus, for each user of the N3 users, there is a vector of the posts by that user (called a user vector embedding) and there is a behavioral footprint from which a profile is determined.

The N3 user vector embeddings extracted as described above are used as the basis for a subsequent machine-learning step to build a method of predicting profiles for arbitrary text.

The Signature Dimensions of a Sequence of Tokens, e.g., Text

Different embodiments may use different demographic dimensions and purely behavioral dimensions in a profile. One embodiment includes the following 11 demographic dimensions (with typical values to be expressed numerically): Gender (male, female), Birth year (four digit year), Birth order (1, 2, 4, 4, 5+), Responsibility for children as a parent or guardian (yes/no); Number of children (1, 2, 4, 4, 5+), Any daughter (yes/no), Marital Status (several), Education (level), Household Income (ranges), Homeowner (own, rent, other), Employment status (full-time, part-time, unemployed, retired)

For each u'th user of the N3 users used for training, there is a vector of P dimensions obtained from the behavioral footprint. We denote the profile for user u as $p_u$, where $p_u = [p_{u1}, p_{u2}, \ldots p_{uP}]$. A user u has a user vector embedding denoted as $v_u = [v_{u1}, v_{u2}, \ldots v_{uM}]$ where M is the number of dimensions of the (vector) user vector embedding. For the machine learning, each dimension of the profile, say the i'th dimension $p_{ui}$ of the u'th user of the N3 users, u=1, ..., N3 and i=1, ..., P, is modeled as a function of the user vector embedding vector $v_u$ of the user, such a function forming a model of the dimension. That is, $$p_{ui} = f_i(v_u), i=1, \ldots, P.$$

$$= f_i(v_{u1}, v_{u2}, \ldots v_{uM}), i=1, \ldots, P.$$

At least one machine-learning method is trained to learn each of the P functions $f_i$, i=1, ..., P. Each $f_i$ is a function of M variables, namely the M-dimensional user vector embedding. We call each such $f_i$ the model for the particular dimension.

Suppose that a profile has $P_{CTS}$ dimensions in the range of [0,1]. In one embodiment, each such dimension is first converted to be in the range $(-\infty, +\infty)$ so that linear regression may be used. For this, one embodiment uses an inverse logistic function y=log(x/(1−x)).

The data is $$p_{ui}=(\beta_{u1}v_{u1}+\beta_{u2}v_{u2}+ \ldots +\beta_{uM}v_{uM}), i=1, \ldots, P_{CTS}, u=1, \ldots, N3.$$

We have as training data $p_{ui}$ and the $\{v_{u1}, v_{u2}, \ldots, v_{uM}\}$ for each of the N3 users. After the machine learning, we end with $P_{CTS}$ models, each delivering each dimension in the range $(-\infty, +\infty)$. To convert each dimension to be in the range (0,1), the logistic function 1/(1+exp(−x)) may be used.

For the machine learning of the demographic dimensions, the user vector embedding vectors are regarded as features, and each of the dimensions, $p_{ui}$ are regarded as a "pattern" or classification for a supervised machine-learning classifier. Thus in some embodiments, the at least one machine-learning method comprises at least one supervised machine-learning classifier. Depending on the particular demographic dimension being modeled, there are three types of classifications: binary classification (predicting one of two possible outcomes), multi-class classification (predicting one of more than two outcomes) and regression (predicting a numeric value).

One embodiment comprises training a plurality of machine-learning methods, carrying out cross-validation, e.g., so-called k-fold cross-validation, and selecting a machine-learning method and corresponding model according to a machine-learning method selection criterion. In one embodiment, the selection of the model that provides the best performance according to a performance criterion. The criterion used depends on the type of classification. In one embodiment, 10-fold cross-validation is carried out for selecting the best-performance model. Other numbers of folds, of course, may be used in alternate embodiments.

Consider a binary-classification dimension, e.g., gender. One embodiment trains three binary machine-learning classifiers on the predicted gender dimension of the N3 users using the vector embedding of the postings by those N3 users as features. The three binary machine-learning classifiers are logistic regression, naive Bayes, and random forests. The "best" model is selected by performing k-fold cross-validation, in particular, 10-fold cross-validation and choosing the model with the highest AUC (area under the ROC curve). The output from such a gender model is then the probability of a user being female (or equivalently the complement of the probability of being male).

Other dimensions of the profile that have two possible values are modeled in a similar way by determining the best model using the three different binary machine-learning classifiers. Note that other embodiments may select the best results from different classifiers, and/or from using a different number of possible classifiers, e.g., selected from the set consisting of support vector machines, logistic regression, decision trees, random forests, gradient-boosted trees, and naive Bayes.

Consider a multi-class classification dimension, e.g., birth-order, which in one embodiment has five possible classifications. One embodiment converts each multi-class dimension modeling into a sequence of binary classifications. Three multi-class machine-learning classifiers on the survey responses for birth-order, converted to binary classifications are used: logistic regression, random forests, and naive Bayes, using the vector embedding vectors of postings by each user as features. The "best" model is selected by performing k-fold cross-validation, e.g., 10-fold cross-validation, and choosing the model with the best performance, where the best performance in one embodiment is the model that achieves the highest AUC score.

Some demographic dimensions are numerical (integer) valued, and in one embodiment, modeling is by linear regression using L2 regularization and cross-validation is used for each such dimension. Another embodiment converts the modeling of a dimension that has numerical values into a sequence of classifications of which ranges of values a dimension falls into. This converts the modeling of a numerical-value dimension into multiclass classification of the dimension (a process which is sometimes called discretizing). As described above, multi-class classification is carried out by a series of binary classifications. As for the binary and multi-class classifiers, several machine-learning methods are used, and the best is selected using cross-validation.

As an alternative to first carrying out feature detection to determine user vector embeddings, one set of embodiments uses a deep neural network to directly model the one or more dimensions from a user's postings using the N3 sets of postings and the known dimensions for training. Training deep neural networks on a sequence of tokens for classification is known. See for example BERT. For a particular profile dimension, the final layer in the neural network may be designed to predict the dimension. For Tweets, the final layer of the BERTweet method can be modified to so predict any and all profile dimensions. The training data is the (possibly filtered) corpus of Tweets from the N3 users or a subset thereof, and the available (or readily determined from behavioral footprints) profiles of the N3 users of the subset thereof. Another example of a deep neural network that can be used is for text and modified to predict dimensions is described in Y. Kim, "Convolutional neural networks for sentence classification," in Proceedings of EMNLP 2014. The following online article compares several pre-trained models: Purva Huigol: "Top 6 Open Source Pretrained Models for Text Classification you should use," retrieved 2021 May 21 at www~dot~analyticsvidhya~dot~com/blog/2020/03/6-pretrained-models-text-classification/

Receiving from the Marketer a Set of Individuals of Interest

Referring now to FIG. 2, one method embodiment includes in 201 receiving from a marketer (typically a client) the user-IDs of a set of individuals, e.g., N11 individuals to whom the marketer wishes to market by sending marketing material in the form of a marketing message of a sequence of tokens. The client-selected individuals have one or more marketer-desired characteristics. The client-selected set of individuals may be selected with the aid of the marketer's CRM or by the marketer selecting users with certain traits or otherwise according to the users' past behavior. As an example, the marketer-selected set may be of customers who purchased a particular product. For example, if the marketer deals with insurance, the client-selected set may be selected according to risk e.g., risk groups, litigation propensity, having cancelled a policy, etc. If the marketer is a marketer of automobiles, the client-selected set may be users who have indicated interest in purchasing a vehicle or who have responded to an advertisement. The client-selected set may also be selected according to desirable dimensions, e.g., behavioral or demographic traits. As an example, N11 is in the order of 20,000 such customers.

Note that a marketer typically identifies a user by a marketer user ID that includes some PII and possibly some CRM information. As part of receiving the N11 users, the marketer user ID is converted to an ID understood by the service operator that internally does not include PII, and a matching process is needed for matching the marketer-provided users to users in the service operator's data store of N0 users.

One version includes matching the client-selected N11 users with the N0 (e.g., 250M or so) behavioral footprints (and corresponding available or easily determined profiles). A user ID matching service may be used for such matching. Not all the N11 users would be part of the N0 users, but for a significant proportion, say N12 users (e.g., N12 may be 30% of the N11 users), behavioral footprints (and corresponding available or easily determined profiles).

One embodiment includes in 203 retrieving or determining from behavioral footprints the profiles of the N12 client-selected users. In one embodiment, the component-wise median (or other representative statistic) of the retrieved or determined profiles of the N12 client-selected users is determined for one or more dimensions to form one or more dimensions of a representative (e.g., median) profile of the client-selected set of N12 users. These representative (e.g., median) dimensions typically are not normalized. That is, the distributions for each different dimension differ sometimes quite significantly in terms of mean and variance, which could potentially bias the determining or prediction towards weighting certain dimensions more than other. To provide normalized dimensions of retrieved or determined profiles, each of the one or more representative (e.g., median) profile dimensions is compared with the corresponding one or more dimensions of baseline profiles of the population determined, for example, by sampling a portion of the N0 (e.g., around 250M) users, e.g., N4 users. This forms a distribution of each corresponding dimension of a profile, called the reference distribution, also called the baseline distribution consisting of distributions for each dimension. For each component, one can compare the representative (e.g., median) dimension value with the reference distribution for that dimension, and thus calculate what a score, e.g., a percentile that the representative, e.g., mean value would have with respect to the baseline distribution. Note that while one embodiment uses percentile scores, alternate embodiments may use z-scores, or other statistical measure. We call these scores of a dimension the normalized dimension. The signature of the client-selected users is the set of the normalized dimensions. Thus, step 207 includes determining the corresponding one or more dimensions of the signature of the N12 client-selected users.

While one embodiment determines for the one or more dimensions of interest the median of the corresponding one or more dimensions and the representative value, alternate embodiments can use another statistic, e.g., the average.

One embodiment includes in 213 accepting creative content as a creative message of sequence of tokens that a client might use to attract a response, e.g., in the case of text, "buy our widgets", a set of one or more dimensions interest may be predicted using the above-described model.

Step 215 includes using the built model to determine one or more dimensions of a profile of the message that may include words and/or emoji and/or one or more images. One embodiment includes normalizing these dimensions. This may be carried out as described above for normalizing dimensions of a signature by comparing each dimension to the dimension of a baseline population and expressing each dimension as a percentile value. The signature of a message is the message vector of all dimensions of the profile of the message with elements expressed in percentile form.

A scoring function S takes two arguments, say x and y, and returns a scalar quantity which is the same in whichever order the arguments are given, e.g., $S(x,y)=S(y,x)$. Step 231 includes determining the score (according to the scoring function) indicative of the relevance of the received creative content to the subset of the client-selected users. The scoring function used in one embodiment is the squared distance between the two vectors representing, respectively, vector of one or more dimensions of the signature of the client-selected users and the corresponding one or more dimensions of the signature of the message, with each dimension of the signatures and signatures normalized, e.g., to percentiles. Alternate embodiments may use other measures for vector similarity, e.g., cosine similarity. Thus step 231 provides a mechanism for providing the client with a measure of relevance of any message to a client-selected audience of a set of users, e.g., the N12 users.

To improve the score indicative of relevance, step 233 includes modifying the creative content, i.e., the message, and repeating steps 215 and 231 with the modified message. Steps 233, 215, and 231 may be repeated until a sufficiently relevant message is obtained.

Suggesting Individual Token Replacements to Increase Relevance to the Client-Selected Users FIG. 3 shows one method 300 of modifying the message to improve the score indicative of the relevance of the message. Method 300 includes in 343 selecting a token for replacement, in 345 selecting an alternative token (a replacement token) to replace the selected token of the message, in 347 modifying the message with the replacement token, in 349 determining the one or more dimensions of the signature of the modified message, and in 351 determining a modified score indicative of the relevance of the modified message to the subset of the client-selected uses using the corresponding one or more dimensions of the signature (determined in 207) of the subset of client-selected users (the N12 users). Not shown in FIG. 2 is an additional step of storing of the corresponding one or more dimensions of the signature of the subset. In FIG. 3, these dimension(s) are shown as being stored in 303. The replacement hopefully causes the scoring function to be increased, while maintaining the grammatical and contextual relevance of the text to the intention of the client. Steps 345, 347, 349, and 351 may be repeated with other replacement tokens. Additionally, the method 200 may be repeated to replace any number of tokens in the message.

One method for suggesting an alternative token to a selected token in the message replacement for the example case of a message of a sequence of tokens is to use the previously discussed word2vec model to find one of other words that are semantically related to the single token being substituted. One embodiment uses cosine similarity as a measure of semantic similarity. Another embodiment uses Euclidian distance. As an example, consider a text sequence, e.g., "I took my cat to the vet." To replace one selected word in the sequence with a more effective word, e.g., suggest alternatives for the word "cat." Determine a vector embedding of the selected word, e.g., using word2vec. It is presumed that a properly trained word2vec model will embed the selected word in close proximity to alternate words that are often used in the same context. We call such words "contextually similar" and "contextual synonyms" to each other. One embodiment uses cosine distance as a measure of contextual similarity, while an alternate embodiment uses Euclidean distance. For example, the vector embedding for "dog" would be in proximity to the vector embedding for "cat."

In one embodiment, a dictionary of candidate replacement tokens is maintained. One embodiment includes starting with the selected word, ranking every other word in the dictionary of words in the corpus according to the contextual similarity to the selected word. In some embodiments, the dictionary is reduced to remove rarely used words and/or insignificant "stop words" such as "the", "and", "a", and so forth, and may also have had proper nouns removed. In one embodiment only a number of the highest ranked contextual synonyms are selected as possible replacement words. In one embodiment, the 100 contextually closest to the selected word are considered. For each these 100 possible replacement words, the method repeats steps 345, 347, and 349 to calculates the one or more dimensions of the signature of the entire sequence after substitution, and then in 351 calculates the distance of the signature of the text to the signature of the N12 subset of the N11 client-selected users. Again, one embodiment uses cosine similarity as the distance measure, while another uses Euclidean distance.

We call this score indicative of relevance the behavioral relevance of the sequence to the client-selected users. It is presumed that some of the contextual synonyms will have higher relevance to the client-selected users than others. One embodiment ranks each of the possible replacements by a weighted combination of contextual relevance (e.g., cosine distance) and behavioral relevance. In one example embodiment, equal weights of 0.5 are used. In one embodiment, the method provides the ranked list of word alternatives to the client (the marketer) to choose the most suitable, if any.

A second method for generating alternative word suggestions is to use a masked language model, which is a deep learning model that is pre-trained on the task of filling in the missing word (e.g., "I took my [MASK] to the vet") where the model learns to predict the most pertinent word to fill-in the [MASK] token. Different embodiments use different implementations of such a model. BERT is one such pre-trained model. Code for such a masked language model is available. See, e.g., "bert-base-uncased" in huggingface-~dot~co/bert-base-uncased available 2021 Apr. 30. See also Ankur Singh: End-to-end Masked Language Modeling with BERT, available 2021 Jun. 1 at keras~dot~io/examples/nlp/masked_language_modeling/. With such a model, the method proceed in a similar manner to the above target word method, except we look at the [MASK] substitutions and then measure the closeness of the text signature and the client-selected users' signature.

It should be noted that the words suggested by word2vec and a masked language model are not generally the same, because the two tasks are somewhat different. In the case of word2vec, there is a known target word being compared. For the [MASK] task the model does not have a specific starting word, just the surrounding context. Therefore, these two methods are somewhat complementary.

Interactive User Interface to Display Relevance in Real Time

One aspect of the invention is a user interface that can provide, in real time, feedback on the relevance of a message to a particular client-selected audience, and also to provide, again in real time, feedback on the effect of changing the message.

Figure 5:
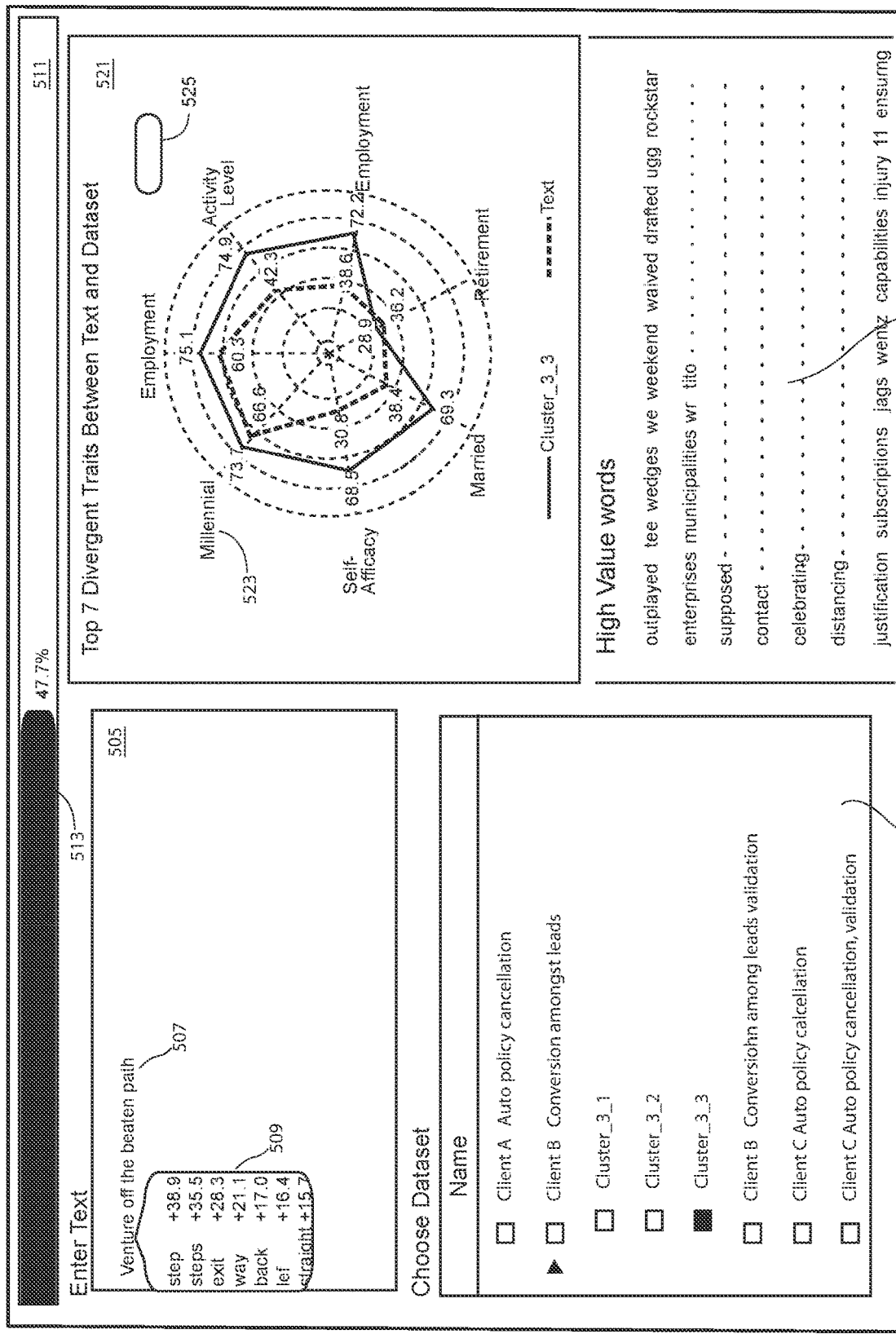
FIG. 5 shows in simplified form one embodiment of a user interface that is displayed on the screen of a monitor coupled to a processing system and that includes aspects of the present invention.

FIG. 5 shows one embodiment of such a user interface 500 that is displayed on the screen of a monitor coupled to a processing system, e.g., coupled to a marketer system. The operator would typically be a client, e.g., a marketer, e.g., a marketer of insurance who wishes to obtain feedback on messages to a selected dataset of users selected by the client. Some of the datasets are segmented into clusters. Each of the datasets, or clusters thereof has a signature, in one embodiment of 31 dimensions, and each signature is calculated and stored for use in the user interface. The segmentation into clusters is cased on the 31-dimensional signatures, and is carried out using a clustering algorithm, e.g., k-means segmentation on the 31 dimensions.

The user interface 500 includes an area 503 that displays to the operator several datasets of client-selected users for whom the text message may be aimed, and whose signatures are pre-stored. The user interface 500 provides a mechanism for the operator to select one of the datasets or a cluster thereof in area 503. In the example shown, cluster_3_3 of dataset "Client B Conversion amongst leads" is shown selected.

The following example is for the tokens of the message being words and emoji. The reader is to understand the term word as used in this section on the user interface may be a text word or an emoji.

One embodiment on the invention has stored a dictionary of some 80,000 words, and for each word also has stored the word's 31-dimensional vector embedding (the word's signature) calculated, e.g., using word2vec. In response to the operator selecting a dataset or cluster, a sorted set of words is displayed in real time in area 531 of the user interface, sorted according to the measure of relevance of the to the selected dataset or cluster, the measure based on word's signature and the signature of the dataset or cluster. The "high value" words are closest to the top left of area 531. For simplicity, not all words in a line of individual words are shown in the drawing, hence the dotted lines.

The user interface 500 includes an area 505 for the operator to enter a text message, and one such message 507 is shown. The words used in the message include words from the dictionary of some 80,000 words with the signature of each words stored. This enables the signature of the complete message to be determined in real time.

Once the signature of the message is available, the measure of relevance of the message to the selected dataset or cluster is determined. In one embodiment, user interface 500 also includes an area 511 that includes a graphic indicator 513 (a bar whose length is variable) that indicated by length the measure of relevance and also provides a numerical value expressed as a percent, the most relevant having a score of 100%. Thus, once the message is entered and the dataset chosen, the user interface in real-time provide feedback on the measure of relevance of the text message to the selected dataset in both graphic form and as a numeral value.

One embodiment of the user interface includes an area 521 in which are displayed "radar views" of 7 dimensions ("traits") of the signature of the selected dataset, and possibly also 7 traits of the text. In the shown embodiment, only 7 of the 31 traits used as radial axes and shown because showing any more may make it hard for a human to visualize the signature. Of course more or fewer axes may be displayed in alternate embodiments. There are two modes of the display. Before any text is entered, in one embodiment the axes are the 7 traits of the selected dataset or cluster that diverge the most between the same traits in a signature of a population of interest and the same traits of the dataset or cluster. As an example, the population of interest may be the population of the of the USA in an embodiment for use in the USA. Once a message is entered, in one embodiment the traits shown are the 7 traits that diverge the most between the signatures of the message and the selected dataset or cluster.

A switch 525 is provided that can switch the type of display from one type to another once a text message is entered. On the display on the 7 axes are the values of the traits of the signature. Lines connect the trait points on the axes so that a viewer may visualize each heptagon, and also when two heptagons are displayed, obtain a visualization of the overlap of the two heptagons as indicative of the measure of relevance.

The user interface 500 in one embodiment also provides for modifying the text message and for providing feedback in real time for how the modifying the message affects the measure of relevance. In one version, when message is entered and displayed in area 505, each token becomes active in that the operator may select the token or indeed the message. In one embodiment when the operator selects on one of the words entered in area 505, a window 509 appears pointing to the word. A list of words that are contextually similar is determined from the dictionary. The change in the measure of relevance is calculated for the determined semantically similar words and sorted in order of increase in the measure of relevance of the modified message after replacement. The first few words are displayed in the window 509 in order of the increase together with the amount of increase or decrease. +26 next to the semantically similar replacement word "get" for "Venture" means that the measure of relevance would increase by 26 percentage points.

An alternate method uses the masked language model described herein above to modify a word in the message. The masked language method looks at the phrase context in the message, and does not consider the selected word for replacement. The method essentially looks for what replacement makes sense in the phrase around the selected word (the blank). Once again, the change is the measure of relevance of making the change is calculated and displayed in window 509 in order of the expected increase in relevance together with the amount of increase or decrease.

Images and Videos

The sequences of tokens are not limited to the English language sequences. The above-described models could be trained on any language and work in essentially the same way.

Additionally, the tokens may be images or parts of video presentations.

Methods for obtaining feature vectors ("feature selection") from images have been used for decades for image recognition, amongst other applications, and software for such feature detection is available. Pre-trained deep convolutional neural networks have been regarded as state of the art, and feature vectors are provided, e.g., in the second-to-last layer. Three popular methods are GoogLeNet (Christian Szegedy et al., "Going Deeper with Convolutions," Proceedings of the IEEE Conference on Computer Vision and Pattern Recognition (CVPR), 2015), VGG-16 (Karen Simonyan, et al. Very Deep Convolutional Networks for Large-Scale Image Recognition. Proceedings, 3rd International Conference on Learning Representations, ICLR 2015, San Diego, CA, USA, May 7-9, 2015) and AlexNet (Krizhevsky, et al, "ImageNet classification with deep convolutional neural networks," Communications of the ACM. Vol. 60 No. 6, pp. 84-90, 2012). Codes for implementing these are publically available, e.g., for Python.

After feature extraction, one embodiment includes clustering the resulting feature vectors into clusters that provide similarities in the images.

One embodiment includes creating the feature vectors for a corpus of images created by users whose profiles are available or can be predicted. Such an embodiment follows the steps described above but for images.

Additionally the tokens may be a time sequence of images, i.e., a video. Video2vec is a deep learning model for learning spatio-temporal vector embeddings for video presentations. See S. Hu, Yikang Li and Baoxin Li, "Video2vec: Learning semantic spatio-temporal vector embeddings for video representation," 2016 23rd International Conference on Pattern Recognition (ICPR), 2016, pp. 811-816. Using such spatio-temporal vector embeddings provides for feature extraction. As for images, one embodiment includes using video2vec followed by clustering the resulting feature vectors into clusters that provide similarities in the images.

A Networked Computing Environment

Figure 4:
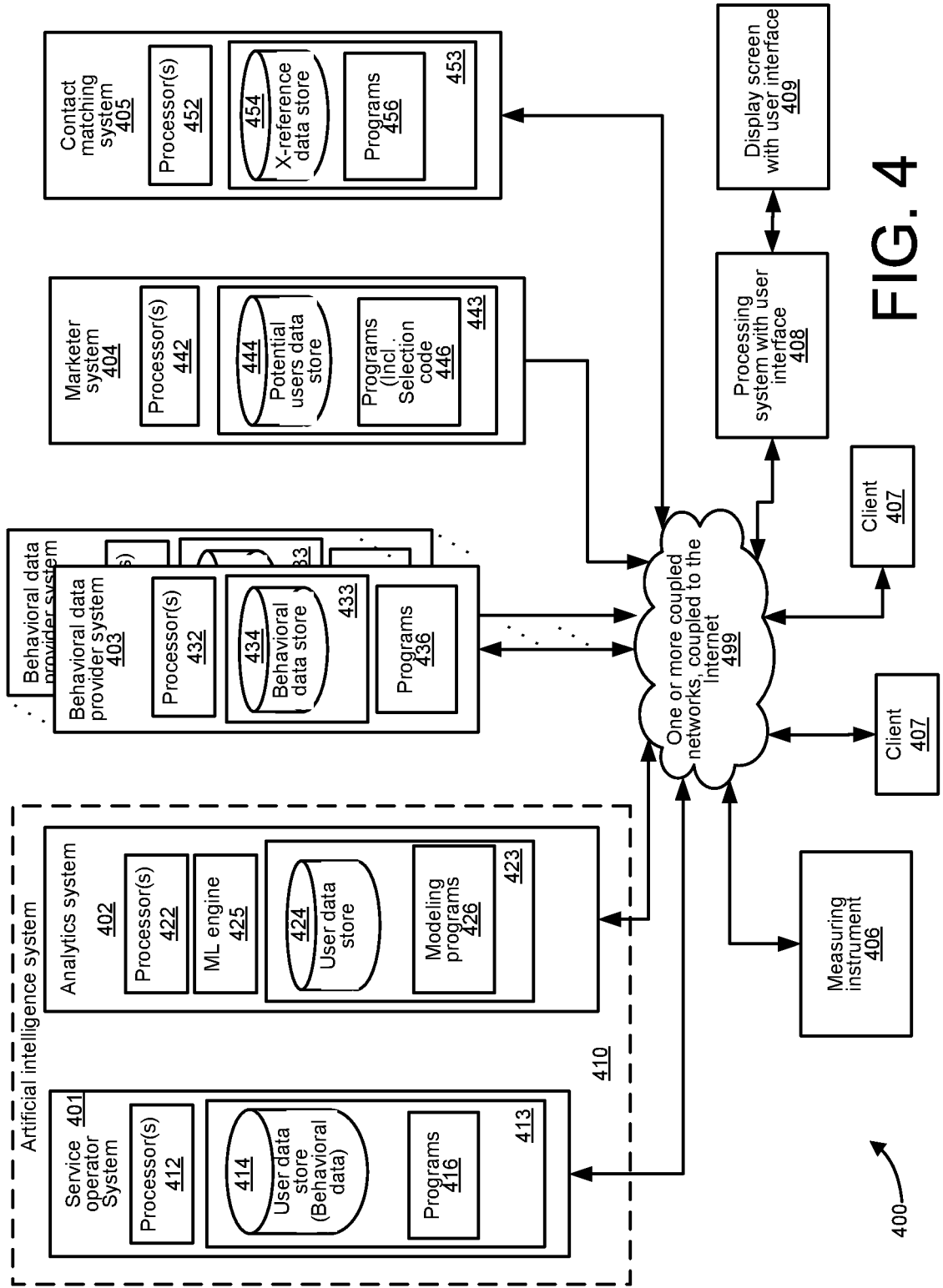
FIG. 4 is an illustrative example of a computing environment for carrying out at least one aspects of the present invention.

FIG. 4 is an example of a distributed data processing system 400 in which embodiments of the invention may be implemented. Some of the processing systems shown are operated by the service operator that provides the above-described service to the client, while others of the processing systems may be operated by third parties. Five main systems are shown, and may be operated as server systems, each of which may be independently, managed, although alternate arrangements may include at least one of the systems being combined, while other embodiments may separate the functionality of one of the systems into more than one system. The systems in distributed system 400 are typically coupled by one or more networks 499, including for example the Internet, and include a service operator system 401, an analytics system 402, a marketer system 404, and a contact matching system 405 that can translate between different systems' IDs, and may also help maintain anonymity. The system 400 may include one or more client processing systems 407, and by way of example, three such clients are shown in FIG. 4. Some of the servers may be virtual servers in a cloud-computing environment. The combination of systems 401 and 402 when coded to carry an embodiment of this invention is referred to as an artificial intelligence system 410. In one embodiment, the artificial intelligence system (systems 401 and 402) is implemented as one or more virtual servers in the cloud-computing environment.

Each system of distributed system 400 may include at least one programmable processor (in general, programmable electronic device combined in some embodiments with special purpose hardware) and a storage subsystem, with the storage subsystem comprising RAM and at least one other storage device, the storage subsystem thus comprising a non-transitory computer-readable medium having stored therein program code comprising machine-readable instructions that when executing on at least one of the processors, causes the system to carry out at least one of the functions described herein. A system in distributed system 400 also may be capable of communicating with other system or systems and client computers such as client processing systems 407 via the one or more networks 499. For the purpose of explaining aspects of the invention, such details as the various interfaces and other elements included in each system are left out of these drawings. Each of systems 401, 402, 403, 404, and 405, may be or include a specialized computer system accessible to multiple client computers 407 via the one or more networks 499. In some embodiments, at least one of the systems 401, 402, 403, 404, and 405 may be a processing system using clustered computers and components that act as a single pool of seamless processing and storage resources when accessed through one or more networks 499, as is common in data centers and with cloud-computing resources for cloud-computing applications. In some embodiments, some of the systems, e.g., the analytics system 402 is configured with special purpose ML hardware to carry out some of the ML aspects of the invention.

Not shown in FIG. 4 are the systems operated by the media platforms on interest such as Twitter, Facebook, and so forth.

The operator of the services in some embodiments of the invention is provided with a service operator system 401 that includes at least one processor 412 and a storage subsystem 413. The storage subsystem 413 may comprise a user data store (DB) 414 that contains data on the population of N0 users, in one embodiment, behavioral data obtained locally and/or from one or more behavioral data provider services that operate respective one or more behavioral data provide systems 403. In some versions, user data store 414 includes PII (hashed in some versions) of the user, a service operator user ID of the user, and the user's behavioral data. Some embodiments include in user data store 414 each user's profile either pre-calculated, or calculated in either system 401 or 402 using, for example, feature extraction. Storage subsystem 413 additionally has program code 416 that carries out aspects of the invention described above.

The user data store 414 typically includes records for a large number N0 of users, for example, hundreds of millions of users.

In some embodiments, the behavioral data in user data store 414 may be in raw form or in the form of vector features as described above.

While in one embodiment, user data store 414 contained the behavioral data, in alternate embodiments, there may be a separate behavioral data store for those users of interest, e.g., the N3 users and the N12 users. Marketing system 404 is a system operated by the client (the customer) of the service operator. System 404 may include one or more processors 442, a storage subsystem 443 that may include program code that includes program code to select users whom the client wants to reach, e.g., the N12 users. Marketing system 404 may as an example be used in an advertising network and may have capabilities as one or more of a CRM system, a supply side platform, a demand side platform, and/or or a data-management platform. These aspects are outside the main focus of the invention, except as they pertain to the client's selecting the N12 users.

Contact matching system 405 may include at least one processor 452 and a storage subsystem 453 that maintains a domain cross-reference data store 454 and that has program code including domain ID replacement program code and domain ID generation program code 456. Data store 454 has a data structure that is used for cross-referencing, with elements containing a mapping between an identifier in a first domain, e.g., the service operator domain, to an identifier in a second domain, e.g., the client's domain. As an example, the first domain might use unique service operator IDs, identifiers that can be linked to PII on those users in its data stores, whereas the second domain, e.g., the service operator system 401's domain operates on additional behavioral data about those users, but the unique identifiers from the second domain cannot be linked to any PII on those users within the marketer system's data store. In some instances, such as where a data store manager in a first domain first passes its data to contact matching system 405 for matching with a second domain, the domain cross-reference data store 454 matches domain-one IDs with their users' corresponding second-domain IDs and then cross-domain ID-replacement code in programs 456 replaces the first domain IDs with second-domain IDs, which it then passes to the second domain system(s). This allows the data recipient in the second domain to operate on only their own user IDs without having access to the unique identifiers of the first domain or to the unique identifiers used by Contact matching system 405. In one embodiment, program code 456 includes code for receiving user-IDs of one domain, and matching these with user IDs in a media platform of interest, e.g., Twitter, Facebook, etc. by connecting the contact-matching system 405 with the system(s) of the needed media platform(s).

In some embodiments the data structure in the data store 454 includes an identity-resolution graph to match contact information.

The above described functionality of contact mapping system 405 may be split between a first contact-mapping system maintained by the operator of the service, and a third-party contact-mapping system such as FullContact, Stirista, Pipl, or similar.

An analytics system 402 is included in one embodiment for carrying out machine-learning modeling aspects of the invention. System 402 comprises at least one processor 422 and a storage subsystem 423 that may include memory and at least one other storage device that includes a non-transitory computer-readable medium. The system 402 may include a machine learning engine (ML engine), which is a special purpose hardware element 425 that is able to carry out some of the machine learning aspects faster that possible with code operating on the processor(s) 422. The storage device in 423 stored a user data store 424 of users who may be identified through an analytics system ID, and program code 426 for running the modeling and predicting methods described herein on the combinations of the processor(s) 422 and ML engine 425.

In one embodiment, the ML engine comprises one or more so-called graphic processor units (GPUs) that are able to perform many matrix multiplications in parallel, so that such ML techniques as using neural networks can be run efficiently. The ML engine may comprise one or more field programmable gate arrays (FPGAs) that are specifically designed to run models such as neural networks. In some embodiments, the ML engine includes what is called a neural processing unit (NPU), also called a tensor-processing unit (TPU), which is an AI accelerator application specific integrated circuit (ASIC) developed specifically for neural-network machine learning. Other ML engines also have been designed.

Using any of the methods explained herein above, analytics system 402 would use its processes to learn methods of predicting summarized behavioral data as feature vectors, and furthermore for carrying out the other machine learning training and modeling methods described herein above.

In some versions of the invention, the service operator system's user data store 414 is assumed to be populated with the behavioral footprints of the population of N0 users, while other versions of the invention include accepting behavioral footprints from one or more behavioral data provider systems 403.

Note that service operator system 401 and the analytics system 402 each includes a user data store in its respective storage subsystem, when and where the user data is stored during carrying out aspects of the invention is a design choice. Furthermore, some embodiments of the hardware system include a single system 401 rather than two separate systems 401 and 402, in which case system 401 may include the ML 425, and the modeling programs 426 would be included in programs 416, and the data in user data store 424 would be included in data store 414.

While FIG. 4 shows analytics system 402 as comprising at least one processor 422 and a storage subsystem 423, such processor(s) with relevant program code may be replaced or augmented in some embodiments by special purpose hardware such as ML engine 425 that is specifically configured to carry out the some of the specific processes described herein.

A Note on the Computing Environment and on Special Hardware

Note that FIG. 4 shows computing environment 100 that includes several systems, each shown, purely for simplicity of explanation, as having at least one processor and a storage subsystem. The systems may be operated by different entities, and several of the features of the invention are operated by or in analytics system 402. The invention however is not limited to the arrangement shown in FIG. 4. Analytics system 402, for example, may be implemented as a system that includes at least one special-purpose machine—the ML engine. Analytics system 402, for example, may also use a set of virtual machines as part of a computer cluster provided via cloud computing. That is, some embodiments of the invention are implemented on a set of computer systems that may be at least one virtual machine that operates "in the cloud," i.e., that operates at least one remote location, and if more than one location, the locations being coupled by an internet of networks to the Internet. For simplicity, all such computers are shown in FIG. 4 as a single system having at least one processor and a storage subsystem wherein data and program code is stored. Cloud computing as used herein means a type of Internet-based computing that provides shared computer processing resources and data to computers and other devices on demand over the Internet. Examples of providers of cloud computing include Amazon Inc.'s Amazon Web Services ("AWS")®, Microsoft Corporation's Microsoft Azure®, IBM SoftLayer®, Google Cloud Platform™ and many others.

Note also that while this disclosure uses the term "data store" as the storage structure that stores data, such a data store may be a database of records. It is to be understood that the term "database" is used in the general sense to mean a data structure for maintaining data. Many such data structures are known and may be used in particular implementations. For example, relational (SQL) databases are commonly known and used. However, this invention is not limited to use such structures. Non-relational databases, also called non_SQL or noSQL databases (e.g. MongoDB), are also known and may be used. Data-warehouse-style data depositories also are known and may be used. Additionally, elastic cache memories (e.g. Redis) may be used to store data. All of these and more data structures are included in the term data store as used herein.

Some embodiments of the invention, e.g., features and methods of analytics system 402, are implemented using a distributed cluster computing framework, in particular Amazon Elastic Map Reduce ("Amazon EMR") in Amazon Web Services ("AWS") run by Amazon, Inc. Amazon EMR is a managed cluster platform that allows clustering commodity hardware together to analyze massive data sets in parallel. A cluster is a collection of virtual machine instances called nodes, which in Amazon EMR are Amazon Elastic Compute Cloud (Amazon EC2) instances. Each instance (node) in the cluster is a virtual server machine having a role within the cluster. For example Amazon EMR provides a so-called master node that manages the cluster by running software components that coordinate the distribution of data and tasks among other nodes—collectively referred to as slave nodes—for processing. The master node tracks the status of tasks and monitors the health of the cluster. A so-called core node is a slave node that has software components that run tasks and store data, e.g., in a distributed file system such as the Apache Hadoop Distributed File System (HDFS) on the cluster, while a so-called task node (if used) is a slave node that has software components that only run tasks. Google (e.g. Google Cloud), Microsoft (e.g. Microsoft Azure), and potentially other future providers offer similar cloud-based services.

The inventor chose to implement many of the methods described herein using publicly available "open source" code. Some embodiments of the invention e.g., features and methods of analytics system 402 use the APACHE SPARK™ framework running over Amazon EMR, in particular machine-learning methods provided by APACHE SPARK™ as Apache Spark MLib. However, the invention is not limited to such an implementation. Furthermore, at this (circa 2021) period of development of computer science, new platforms are being introduced that may also be suitable for implementing embodiments of the methods and systems described herein, e.g., deep-learning frameworks such as TensorFlow and PyTorch.

APACHE SPARK™ is referred to herein as Apache Spark, or simply as Spark, and is an open-source large-scale distributed-processing framework which targets, inter alia, machine-learning iterative workloads. Spark uses a functional programming paradigm, and applies the functional programming paradigm on large clusters by providing a fault-tolerant implementation of distributed data sets called Resilient Distributed Data (RDD), each of which can reside in the main memory of the cluster (or in blocks of disks). The ability of storing the data in main memory enables computation to occur much faster than if the data was stored in physical disks. Spark also enables fault-tolerant computing. Computation in Spark is expressed using functional transformations over RDDs. For more information on Apache Spark, see Zaharia, et al, "Apache Spark: A Unified Engine for Big Data Processing," Communication of the ACM, vol. 49, No. 11, pp. 56-65, 2016.

In one embodiment, the machine-learning (ML) methods described herein in analytics system 402 use algorithms and utilities provided in Spark and part of Apache Spark's MLlib. Spark's MLlib provides methods usable for binary classification, logistic regression, naive Bayes, and others; for regression, generalized linear regression, survival regression, and others; for decision trees, random forests, and gradient-boosted trees; for alternating least squares (ALS); for clustering, K-means, Gaussian mixtures (GMMs), and other clustering techniques; for topic modeling: latent Dirichlet allocation (LDA); and for mining, frequent item sets, association rules, and sequential pattern mining. Spark also includes ML workflow utilities, including for feature transformations, standardization, normalization, hashing, and others; ML Pipeline construction methods; model evaluation methods; hyper-parameter tuning methods; and for ML persistence, methods for saving and loading models and Pipelines. Spark also has other utilities including for distributed linear algebra: SVD, PCA, and others; and for statistics, summary statistics, hypothesis testing, and other statistical methods.

It should be clear to those of ordinary skill in the art that alternate embodiments of the invention can be built by writing special-purpose programs rather than using methods available as open-source code, and also by using available methods other than and/or in addition to those provided by Apache Spark. One example of alternate code is "sci-kit learn," a set of machine-learning algorithms in Python which can operate on the Google Cloud. See, for example, scikit-learn~dot~org/stable/retrieved 2016 Jun. 6, where ~dot~denotes the period (".") character in the actual URL.

GENERAL

Unless specifically stated otherwise, as apparent from the following discussions, it is appreciated that throughout the specification discussions utilizing terms such as "processing," "computing," "calculating," "determining," or the like, these terms refer to the action and/or processes of a host device or computing system, or similar electronic computing device, that manipulates and/or transforms data represented as physical, such as electronic, quantities into other data similarly represented as physical quantities.

In a similar manner, the term "processor" may refer to any device or portion of a device that is programmable via machine-readable instructions and that processes electronic data, e.g., from registers and/or memory, to transform that electronic data into other electronic data that, e.g., may be stored in registers and/or memory.

The term "a set of none or more elements" means a set which may have no elements or at least one element, and therefore includes the possibility of one element, more than one element, or an empty set of no elements. It is a term in common usage by those skilled in the art of computer science.

Some of the steps of methodologies described herein are, in one embodiment, performable by a system comprising at least one processor that accepts machine-readable instructions, e.g., as firmware or as software, and a machine learning engine, the system when executing the instructions, carries out at least one of the methods described herein. In such embodiments, any processor capable of executing a set of instructions (sequential or otherwise) that specify actions to be taken may be included. Thus, one example is a programmable DSP device. Another is the CPU of a microprocessor or other computer-device, or the processing part of a larger ASIC. A processing system may include a storage subsystem including memory such as main RAM and/or a static RAM, and/or ROM, and at least one other storage device. A bus subsystem may be included for communicating between the components. The processing system further may be a distributed processing system with processors coupled wirelessly or otherwise, e.g., by a network. The processing system also may be part of a cluster, and may be provided "in the cloud" as cloud-based service.

If the processing system requires a display, such a display may be included. The processing system in some configurations may include a sound input device, a sound output device, and a network interface device.

The processing system's storage subsystem thus includes a machine-readable non-transitory medium that is coded with, i.e., has stored therein a set of instructions to cause, when executed by at least one processor and the machine learning engine, performing at least one of the methods described herein.

Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Thus, one embodiment of each of the methods described herein is in the form of a non-transitory machine-readable medium coded with, i.e., having stored therein a set of instructions for execution on at least one processor and a machine learning engine.

Note that, as is understood in the art, a processing system with application-specific firmware for carrying out. with the included machine-learning engine, at least one aspect of the invention becomes a special purpose machine that is modified by the firmware to carry out at least one aspect of the invention. This is different than a general-purpose processing system using software, as the machine is especially configured to carry out at least one aspect. Furthermore, as would be known to one skilled in the art, if the number of units to be produced justifies the cost, any set of instructions in combination with elements such as the processor may be readily converted into a special purpose ASIC or custom integrated circuit.

Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code, including a set of instructions that when executed on at least one processor cause the processor or processors to implement a method. Accordingly, aspects of the present invention may take the form of a method, an entirely hardware embodiment, an entirely software embodiment, or an embodiment combining software and hardware aspects. Furthermore, the present invention may take the form a computer program product on a non-transitory machine-readable storage medium encoded with machine-executable instructions.

Reference throughout this specification to "some embodiments," "one embodiment," "embodiments," or "an embodiment" means that a particular feature, structure, or characteristic described in connection with the embodiment is included in at least one embodiment of the present invention. Thus, appearances of the phrases "in some embodiments," "in one embodiment," "in an embodiment," or similar statements in various places throughout this specification are not necessarily all referring to the same embodiment, but may. Furthermore, the particular features, structures or characteristics may be combined in any suitable manner, as would be apparent to one of ordinary skill in the art from this disclosure, in at least one embodiment.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Similarly it should be appreciated that in the above description of example embodiments of the invention, various features of the invention are sometimes grouped together in a single embodiment, figure, or description thereof for the purpose of streamlining the disclosure and aiding in the understanding of at least one of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Conjunctive language, such as phrases of the form "at least one of A, B, or C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Similarly, "A, B, and/or C" refer to any of the following sets {A}, {B}, {C}, {A, B}, {A, C}, {B, C}, {A, B, C}.

All publications, patents, and patent applications cited herein are hereby incorporated herein by reference in any jurisdiction in which such incorporation by reference is permitted. In any jurisdiction which does not permit such incorporation by reference, Applicant reserves the right to insert material from any such publication, patent, and/or patent application that is or are cited herein without such insertion being considered as adding new matter to the description.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, "including" is synonymous with and means "comprising."

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the invention as claimed, and it is intended to claim all such changes and modifications. For example, any formulas given above are merely representative of procedures that may be used. Functionality may be added or deleted from the block diagrams, and operations may be interchanged among functional blocks. Steps may be added or deleted to methods described within the present invention as claimed.

Note that the claims attached to this description form part of the description, so are incorporated by reference into the description in any jurisdiction that allows such incorporation of the claims by reference, each claim forming a different set of at least one example embodiment. For any jurisdictions that does not permit such incorporation by reference, Applicant reserves the right to insert the claims herein as sets of example embodiments without such insertion being considered as adding new matter.

What is claimed is:

1. A system for using artificial intelligence to determine a measure of relevance of a client-provided message to client-provided users, the system comprising:
   at least one processor; and
   storage,
   the storage containing code that when executed by the system causes the system to:
   build a machine-learning model to predict two or more dimensions of a multidimensional profile of a message of creative content, the building using postings on media platforms by a set of users and the two or more dimensions of multidimensional profiles of the users of the set;
   receive a message of creative content from a client;
   use the built machine-learning model to determine the two or more dimensions of a multidimensional signature of the received message;
   receive from the client a set of client-selected users on whom behavioral footprint data is available;
   retrieve or determine the two or more dimensions of the multidimensional profiles of the set of client-selected users;
   determine the two or more dimensions of a multidimensional signature of the set of client-selected users; and
   compare the two or more dimensions of the multidimensional signature of the set of client-selected users and the two or more dimensions of the multidimensional signature of the received message to determine a measure of relevance of the message of creative content to the set of client-selected users.

2. The system of claim 1, wherein the code when executed further causes the system to:
receive a modification of the message of creative content to form a modified message of creative content; and
determine the measure of relevance of the modified message to the set of client-selected users.

3. The system of claim 1, wherein the measure of relevance is a measure of similarity of the two or more dimensions of the multidimensional signature of the message of creative content and the corresponding two or more dimensions of the multidimensional signature of the set of client-selected users.

4. The system of claim 1, wherein the determining of the two or more dimensions of the multidimensional signature of the set of client-selected users includes determining the two or more dimensions of a representative multidimensional profile of the set of client-selected users, and normalizing the two or more dimensions of the representative multidimensional profile.

5. The system of claim 1,
wherein determining the one or more dimensions of the multidimensional profiles of the set of users comprises:
retrieving behavioral footprint data of N2 users who each has an account on a at least one media platform, the retrieving being from a data store of behavioral-footprint data of a population of users that includes the N2 users, the set of users being a subset of the N2 users;
for each of at least some of the N2 users, retrieving postings created by said each user from said each user's respective one or more media platforms; and
carrying out feature extraction to determine the one or more dimensions of the multidimensional profiles of the set of users.

6. The system of claim 5,
wherein the code further causes the system to select from users received from the client-selected users on whom behavioral footprint data is available in the data store.

7. The system of claim 6, wherein the code that when executed causes the system to retrieve the behavioral footprint data on the set of N2 users who each has an account on at least one media platform further comprises code that when executed causes the system to:
retrieve a sample of N1 users from a data store, each of the N1 users having a behavioral-footprint-user-ID; and
from the behavioral-footprint-user-IDs of the N1 users, obtain media-platform-user-IDs of the set of N2 users who each has an account on the at least one media platform,
wherein each posting comprising a sequence of one or more tokens, a token being a word, an emoji, or an image.

8. The system of claim 7, wherein the obtaining the media-platform-user-IDs includes carrying out a contact-matching method on the user IDs of at least some of the N1 users.

9. The system of claim 7, wherein the tokens in the retrieved postings and in the received message are words.

10. The system of claim 6, wherein the code when executed further causes the system to filter the retrieved postings according to one or more posting-viability criteria, the filtering forming a filtered corpus of postings by N3 of the cot of N2 users, N3≤N2, such that the behavioral footprints of the N3 users are retrieved and the two or more dimensions of the profiles of the N3 users are retrieved or determined, and such that the retrieved postings of the N3 users and the two or more dimensions of the multidimensional profiles of the N3 users are used to determine the model.

11. The system of claim 6, wherein at least some of the users whose postings are retrieved have a plurality of postings, and wherein determining the model includes determining a user embedding of each of the users whose postings are retrieved.

12. The system of claim 11, wherein each user's embedding is determined from vector embeddings of the postings of said each user, the vector embedding of each posting being determined from vector embeddings of the tokens of said each posting, or the vector embedding of each posting being determined using a deep neural network designed to determine the posting's vector embedding directly from the posting.

13. The system of claim 1, further comprising a machine learning engine, wherein at least the building of the machine-learning model uses the machine learning engine.

14. A processing-system-implemented method that uses artificial intelligence to determine a measure of relevance of a client-provided message to client-provided users, the method comprising:
building a machine-learning model to predict two or more dimensions of a multidimensional profile of a message of creative content, the building using postings on at least one respective media platform of each of a set of users and two or more dimensions of multidimensional profiles of the users of the set;
receiving a message of creative content from a client;
using the built machine-learning model to determine the two or more dimensions of a multidimensional signature of the received message;
receiving from the client client-selected users;
selecting from the client-selected users a set of client-selected users on whom behavioral footprint data is available;
retrieving or determining the two or more dimensions of the multidimensional profiles of the set of client-selected users;
determining the two or more dimensions of a multidimensional signature of the set of client-selected users; and
comparing the two or more dimensions of the signatures of the set of client-selected users and of the received message to determine a measure of relevance of the message of creative content to the set of client-selected users.

15. The method of claim 14, further comprising:
receiving a modification of the message of creative content to form a modified message of creative content; and
determining the measure of relevance of the modified message to the set of client-selected users.

16. The method of claim 14, wherein the measure of relevance is a measure of similarity of the two or more dimensions of the multidimensional signature of the message of creative content and the corresponding two or more dimensions of the multidimensional signature of the set of client-selected users.

17. The method of claim 14, wherein the determining of the two or more dimensions of the multidimensional signature of the set of client-selected users includes determining the two or more dimensions of a representative multidimensional profile of the set of client-selected users, and normalizing the two or more dimensions of the representative multidimensional profile.

18. The method of claim 14, wherein each posting and each received message includes a sequence of one or more tokens, a token being a word, an emoji, or an image, and wherein the tokens in the retrieved postings and in the received message are words.

19. The method of claim 14,
wherein determining the two or more dimensions of the multidimensional profiles of the set of users comprises:
retrieving behavioral footprint data of N2 users who each has an account on a at least one media platform, the retrieving being from a data store of behavioral-footprint data of a population of users that includes the N2 users, the set of users being a subset of the N2 users;
for each of at least some of the N2 users, retrieving postings created by said each user from said each user's respective one or more media platforms; and
carrying out feature extraction to determine the two or more dimensions of the multidimensional profiles of the set of users.

20. The method of claim 19, wherein the retrieving the behavioral footprint data on the set of N2 users comprises:
retrieving a sample of N1 users from a data store, each of the N1 users having a behavioral-footprint-user-ID; and
obtaining from behavioral-footprint-user-IDs of the N1 users the media-platform-user-IDs of the set of N2 users who each has an account on the at least one media platform,
wherein each posting comprises a sequence of one or more tokens, a token being a word, an emoji, or an image.

21. The method of claim 20, wherein the obtaining the media-platform-user-IDs includes carrying out a contact-matching method on the user IDs of at least some of the N1 users.

22. The method of claim 19, further comprising filtering the retrieved postings according to one or more posting-viability criteria, the filtering forming a filtered corpus of postings by N3 of the N2 users, N3≤N2, such that the behavioral footprints of the N3 users are retrieved and the two or more dimensions of profiles of the N3 users are retrieved or determined, and such that the retrieved postings of the N3 users and the two or more dimensions of the multidimensional profiles of the N3 users are used to determine the model.

23. The method of claim 19, wherein at least some of the users whose postings are retrieved have a plurality of postings, and wherein determining the model includes determining a user embedding of each of the users whose postings are retrieved.

24. The method of claim 23, wherein each posting comprises a sequence of one or more tokens, a token being a word, an emoji, or an image, and wherein each user's embedding is determined from vector embeddings of the postings of said each user, the vector embedding of each posting being determined from vector embeddings of the tokens of said each posting, or the vector embedding of each posting being determined using a deep neural network designed to determine the posting's vector embedding directly from the posting.

25. The method of claim 14, wherein at least the building of the machine-learning model uses a machine-learning engine that is part of the processing system.

26. A non-transitory machine-readable medium having stored therein a set of instructions for execution on a processing system that includes at least one processor and a machine learning engine, the execution causing a method to be carried out of determining a measure of relevance of a client-provided message to client-provided users, the method comprising:
building a machine-learning model to predict the two or more dimensions of a multidimensional profile of a message of creative content, the building using postings on at least one respective media platform of each of a set of users and two or more dimensions of multidimensional profiles of the users of the set;
receiving a message of creative content from a client;
using the built machine-learning model to determine the two or more dimensions of a multidimensional signature of the received message;
receiving from the client client-selected users;
selecting from the client-selected users a set of client-selected users on whom behavioral footprint data is available;
retrieving or determining the two or more dimensions of the subset multidimensional profiles of the set of client-selected users;
determining the two or more dimensions of a multidimensional signature of the set of client-selected users; and
comparing the two or more dimensions of the signatures of the set of client-selected users and of the received message to determine a measure of relevance of the message of creative content to the set of client-selected users.

27. The non-transitory machine-readable medium of claim 26 wherein at least the building of the machine-learning model uses a machine learning engine that is part of the processing system.

\* \* \* \* \*